United States Patent
Yang et al.

(10) Patent No.: US 11,502,182 B2
(45) Date of Patent: Nov. 15, 2022

(54) SELECTIVE GATE AIR SPACER FORMATION

(71) Applicant: Taiwan Semiconductor Manufacturing Co., Ltd., Hsin-Chu (TW)

(72) Inventors: Chih-Hsin Yang, Hsinchu (TW); Yen-Ming Chen, Hsin-Chu County (TW); Feng-Cheng Yang, Hsinchu County (TW); Tsung-Lin Lee, Hsinchu (TW); Wei-Yang Lee, Taipei (TW); Dian-Hau Chen, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 102 days.

(21) Appl. No.: 16/872,166

(22) Filed: May 11, 2020

(65) Prior Publication Data

US 2021/0351277 A1    Nov. 11, 2021

(51) Int. Cl.

| | |
|---|---|
| H01L 29/66 | (2006.01) |
| H01L 29/165 | (2006.01) |
| H01L 29/49 | (2006.01) |
| G06F 30/392 | (2020.01) |
| H01L 21/764 | (2006.01) |
| H01L 21/8238 | (2006.01) |
| H01L 27/092 | (2006.01) |
| G06F 119/18 | (2020.01) |

(52) U.S. Cl.
CPC ........ *H01L 29/4991* (2013.01); *G06F 30/392* (2020.01); *H01L 21/764* (2013.01); *H01L 21/823821* (2013.01); *H01L 21/823864* (2013.01); *H01L 27/0924* (2013.01); *H01L 29/6653* (2013.01); *G06F 2119/18* (2020.01)

(58) Field of Classification Search
None
See application file for complete search history.

(56) References Cited

U.S. PATENT DOCUMENTS

| 8,039,179 B2 | 10/2011 | Shieh et al. |
| 8,202,681 B2 | 6/2012 | Lin et al. |
| (Continued) | | |

FOREIGN PATENT DOCUMENTS

| KR | 20140025746 A | 3/2014 |
| KR | 20160074306 A | 6/2016 |
| (Continued) | | |

OTHER PUBLICATIONS

Korean Patent Application No. 10-2020-0097234, Korean Intellectual Property Office, Notice of allowance of Patent, dated Sep. 28, 2022.

*Primary Examiner* — Joseph C. Nicely
*Assistant Examiner* — Lamont B Koo
(74) *Attorney, Agent, or Firm* — Haynes and Boone, LLP

(57) ABSTRACT

A semiconductor device includes a substrate. A gate structure is disposed over the substrate in a vertical direction. The gate structure extends in a first horizontal direction. An air spacer is disposed adjacent to a first portion of the gate structure in a second horizontal direction that is different from the first horizontal direction. The air spacer has a vertical boundary in a cross-sectional side view defined by the vertical direction and the first horizontal direction.

20 Claims, 17 Drawing Sheets

(56) References Cited

U.S. PATENT DOCUMENTS

| | | |
|---|---|---|
| 8,728,332 B2 | 5/2014 | Lin et al. |
| 8,822,243 B2 | 9/2014 | Yan et al. |
| 2006/0091468 A1 | 5/2006 | Liaw |
| 2011/0281208 A1 | 11/2011 | Lin et al. |
| 2012/0278776 A1 | 11/2012 | Lei et al. |
| 2013/0248950 A1* | 9/2013 | Kang ............... H01L 29/4991 257/288 |
| 2013/0295769 A1 | 11/2013 | Lin et al. |
| 2013/0320451 A1 | 12/2013 | Liu et al. |
| 2014/0054713 A1 | 2/2014 | Lee et al. |
| 2014/0193974 A1 | 7/2014 | Lee et al. |
| 2014/0215421 A1 | 7/2014 | Chen et al. |
| 2014/0242794 A1 | 8/2014 | Lin et al. |
| 2014/0264760 A1 | 9/2014 | Chang et al. |
| 2014/0264899 A1 | 9/2014 | Chang et al. |
| 2014/0273442 A1 | 9/2014 | Liu et al. |
| 2014/0273446 A1 | 9/2014 | Huang et al. |
| 2016/0181143 A1 | 6/2016 | Kwon et al. |
| 2017/0141108 A1* | 5/2017 | Chang ............... H01L 29/0638 |
| 2017/0229452 A1* | 8/2017 | Chang ............... H01L 29/0649 |
| 2018/0097059 A1* | 4/2018 | Bi ..................... H01L 29/401 |
| 2018/0190796 A1* | 7/2018 | Ching ............... H01L 21/02271 |

FOREIGN PATENT DOCUMENTS

| | | |
|---|---|---|
| KR | 20170077765 A | 7/2017 |
| KR | 20200008515 A | 1/2020 |
| TW | 201436217 A | 9/2014 |
| TW | 201923970 A | 6/2019 |

* cited by examiner

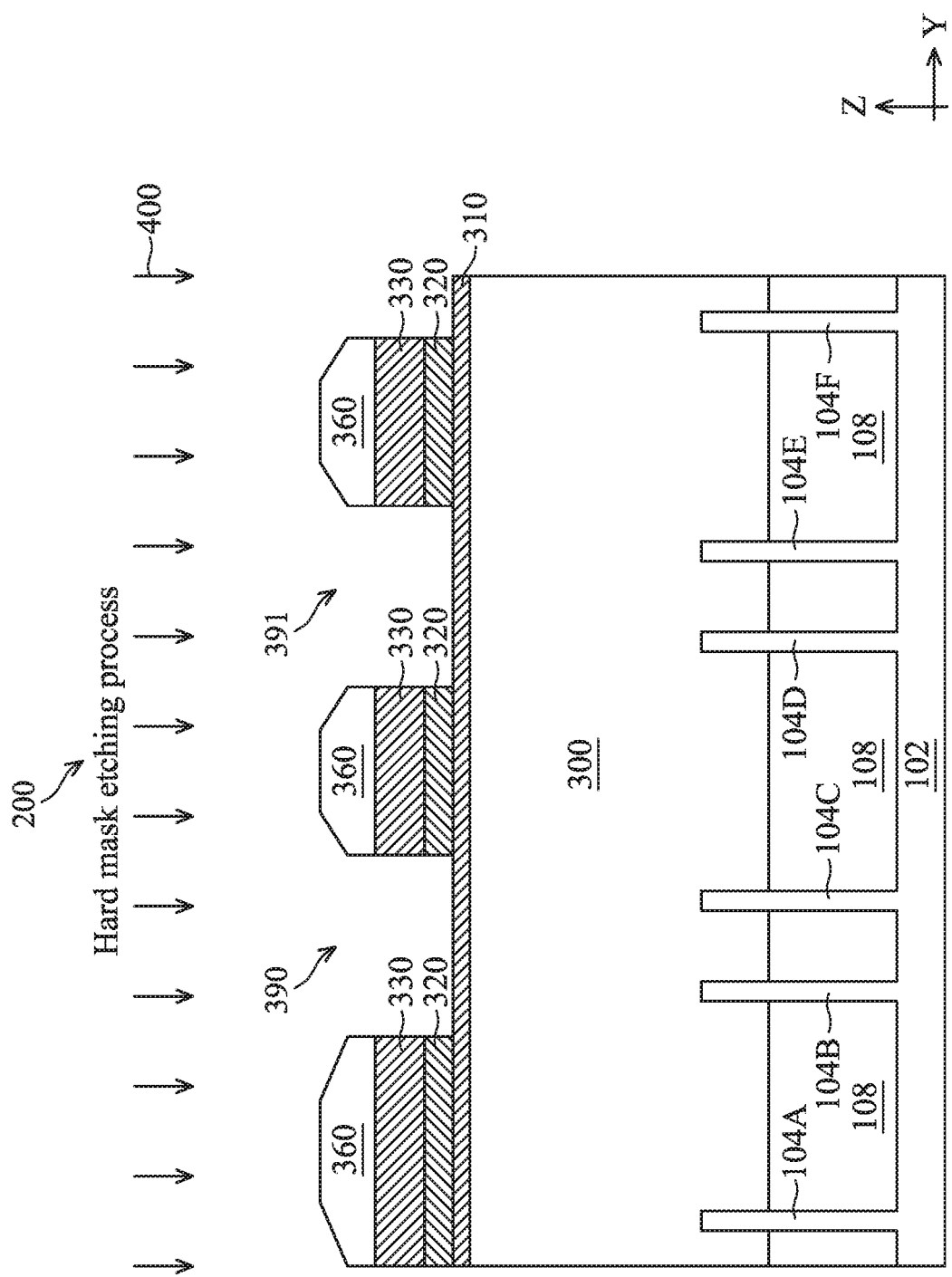

SELECTIVE GATE AIR SPACER FORMATION

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs.

For example, methods have been developed to form gate spacers with a low dielectric constant, such as air spacers. However, as device sizes continue to decrease, conventional methods of forming air spacers may lead to problems such as the collapsing of gate structures, unwanted etching byproducts, excessive damage to other components, etc. Therefore, while conventional methods of forming low-k dielectric gate spacers have generally been adequate, they have not been satisfactory in all aspects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 3A and 3-7 are cross-sectional views of an embodiment of a FinFET device at various stages of fabrication according to various aspects of the present disclosure.

DETAILED DESCRIPTION

Figure 1:
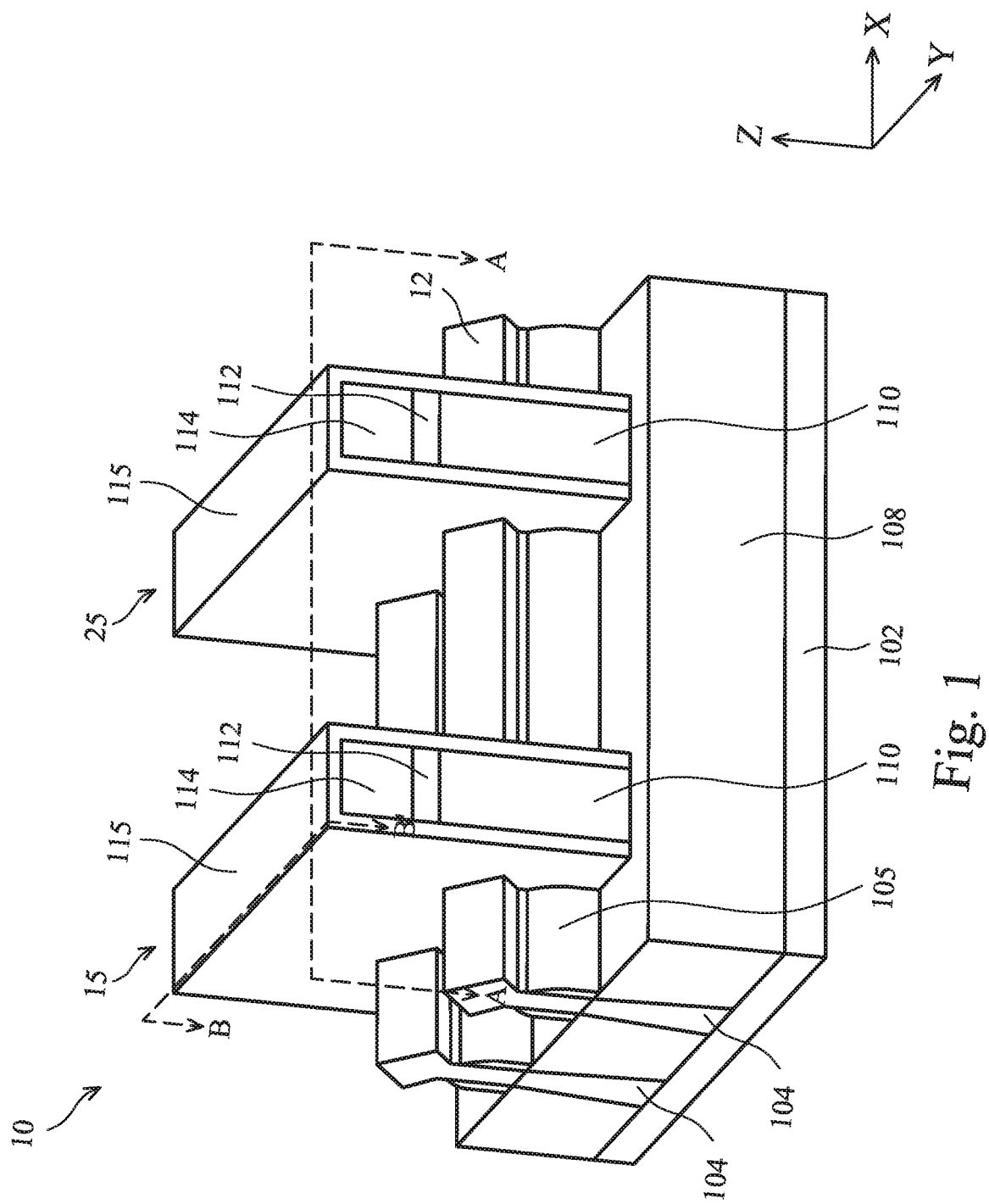
FIG. 1 is a perspective view of a FinFET device according to various aspects of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc., as well as derivatives thereof (e.g., "horizontally," "downwardly," "upwardly," etc.) are used for ease of the present disclosure of one features relationship to another feature. The spatially relative terms are intended to cover different orientations of the device including the features. Still further, when a number or a range of numbers is described with "about," "approximate," and the like, the term is intended to encompass numbers that are within a reasonable range including the number described, such as within +/−10% of the number described or other values as understood by person skilled in the art. For example, the term "about 5 nm" encompasses the dimension range from 4.5 nm to 5.5 nm.

The present disclosure is generally related to semiconductor devices, and more particularly to field-effect transistors (FETs), such as planar FETs or three-dimensional fin-line FETs (FinFETs). One aspect of the present disclosure involves forming high-k metal gate spacers as a part of semiconductor device fabrication.

During fabrication of a FinFET structure, air gaps (referred to as air spacers) may be formed in place of gate spacer disposed on sidewalls of gate structures (e.g., high-k metal gate structures (HKMGs)). In some embodiments, air spacers formed between gate structures and additional dielectric layers in active device regions reduce the capacitance of the gate structures, thereby improving the overall performance (e.g., speed) of the FinFET structure. However, conventional methods of forming air spacers may still need improvement. For example, it may be difficult to form air spacers in high aspect ratio (e.g., a ratio of height and width of a trench) situations without causing the gate structures to wiggle or collapse. As another example, conventional air spacer formation processes may cause damage to certain other components, such as shallow trench isolation (STI) structures. As yet another example, conventional air spacer formation processes may generate unwanted etching byproducts, which may compromise device performance.

Many of these problems discussed above are rooted in the fact that conventional air spacer formation processes form air spacers indiscriminately for all types of IC devices.

However, in real world applications, certain types of IC devices (e.g., ring oscillators) may benefit more from having air spacers, while other types of IC devices (SRAM) may not need air spacers. The present disclosure takes this into account prior to the formation of air spacers and consequently forms air spacers for IC devices that need them, but not for IC devices that may not need them. In other words, the present disclosure selectively forms air spacers for particular types of IC devices on a wafer, while no air spacers are formed for the rest of the IC devices on the wafer. In some embodiments, the selective air spacer formation may be achieved using lithography to pattern hard masks, and the patterned hard masks may be used to define the regions of the wafer in which air spacers are to be formed. The selective air spacer formation alleviates the gate structure wiggling or collapsing problems, reduces unwanted etching byproducts, and lessens the damage to the STI structures. The various aspects of the present disclosure are discussed in more detail below.

Referring to FIG. 1, a perspective view of an example FinFET device 10 is illustrated. The FinFET device structure 10 includes an N-type FinFET device structure (NMOS) 15 and a P-type FinFET device structure (PMOS) 25. The FinFET device structure 10 includes a substrate 102. The substrate 102 may be made of silicon or other semiconductor materials. Alternatively or additionally, the substrate 102 may include other elementary semiconductor materials such as germanium. In some embodiments, the substrate 102 is made of a compound semiconductor such as silicon carbide, gallium arsenic, indium arsenide, or indium phosphide. In some embodiments, the substrate 102 is made of an alloy semiconductor such as silicon germanium, silicon germanium carbide, gallium arsenic phosphide, or gallium indium phosphide. In some embodiments, the substrate 102 includes an epitaxial layer. For example, the substrate 102 may include an epitaxial layer overlying a bulk semiconductor.

The FinFET device structure 10 also includes one or more fin structures 104 (e.g., Si fins) that extend from the substrate 102 in the Z-direction and surrounded by spacers 105 in the Y-direction. The fin structure 104 is elongated in the X-direction and may optionally include germanium (Ge). The fin structure 104 may be formed by using suitable processes such as photolithography and etching processes. In some embodiments, the fin structure 104 is etched from the substrate 102 using dry etch or plasma processes. In some other embodiments, the fin structure 104 can be formed by a multiple patterning lithography process, such as a double-patterning lithography (DPL) process. DPL is a method of constructing a pattern on a substrate by dividing the pattern into two interleaved patterns. DPL allows enhanced feature (e.g., fin) density. The fin structure 104 also includes an epi-grown material 120, which may (along with portions of the fin structure 104) serve as the source/drain of the FinFET device structure 10.

An isolation structure 108, such as a shallow trench isolation (STI) structure, is formed to surround the fin structure 104. In some embodiments, a lower portion of the fin structure 104 is surrounded by the isolation structure 108, and an upper portion of the fin structure 104 protrudes from the isolation structure 108, as shown in FIG. 1. In other words, a portion of the fin structure 104 is embedded in the isolation structure 108. The isolation structure 108 prevents electrical interference or crosstalk.

The FinFET device structure 10 further includes a gate stack structure including a gate electrode 110 and a gate dielectric layer (not shown) below the gate electrode 110. The gate electrode 110 may include polysilicon or metal. Metal includes tantalum nitride (TaN), nickel silicon (NiSi), cobalt silicon (CoSi), molybdenum (Mo), copper (Cu), tungsten (W), aluminum (Al), cobalt (Co), zirconium (Zr), platinum (Pt), or other applicable materials. Gate electrode 110 may be formed in a gate last process (or gate replacement process). Hard mask layers 112 and 114 may be used to define the gate electrode 110. One or more dielectric layers 115 may also be formed on the sidewalls of the gate electrode 110 and over the hard mask layers 112 and 114. In at least one embodiment, the dielectric layers 115 may be directly in contact with the gate electrode 110. The one or more dielectric layers 115 may be patterned to form gate spacers, and some of the gate spacers may be removed according to the present disclosure to form air spacers, as discussed in more detail below.

The gate dielectric layer (not shown) may include dielectric materials, such as silicon oxide, silicon nitride, silicon oxynitride, dielectric material(s) with high dielectric constant (high-k), or combinations thereof. Examples of high-k dielectric materials include hafnium oxide, zirconium oxide, aluminum oxide, hafnium dioxide-alumina alloy, hafnium silicon oxide, hafnium silicon oxynitride, hafnium tantalum oxide, hafnium titanium oxide, hafnium zirconium oxide, the like, or combinations thereof.

In some embodiments, the gate stack structure includes additional layers, such as interfacial layers, capping layers, diffusion/barrier layers, or other applicable layers. In some embodiments, the gate stack structure is formed over a central portion of the fin structure 104. In some other embodiments, multiple gate stack structures are formed over the fin structure 104. In some other embodiments, the gate stack structure includes a dummy gate stack and is replaced later by a metal gate (MG) after high thermal budget processes are performed.

The gate stack structure is formed by a deposition process, a photolithography process and an etching process. The deposition process includes chemical vapor deposition (CVD), physical vapor deposition (PVD), atomic layer deposition (ALD), high density plasma CVD (HDPCVD), metal organic CVD (MOCVD), remote plasma CVD (RPCVD), plasma enhanced CVD (PECVD), plating, other suitable methods, and/or combinations thereof. The photolithography processes include photoresist coating (e.g., spin-on coating), soft baking, mask aligning, exposure, post-exposure baking, developing the photoresist, rinsing, drying (e.g., hard baking). The etching process includes a dry etching process or a wet etching process. Alternatively, the photolithography process is implemented or replaced by other proper methods such as maskless photolithography, electron-beam writing, and ion-beam writing.

Figure 2A:
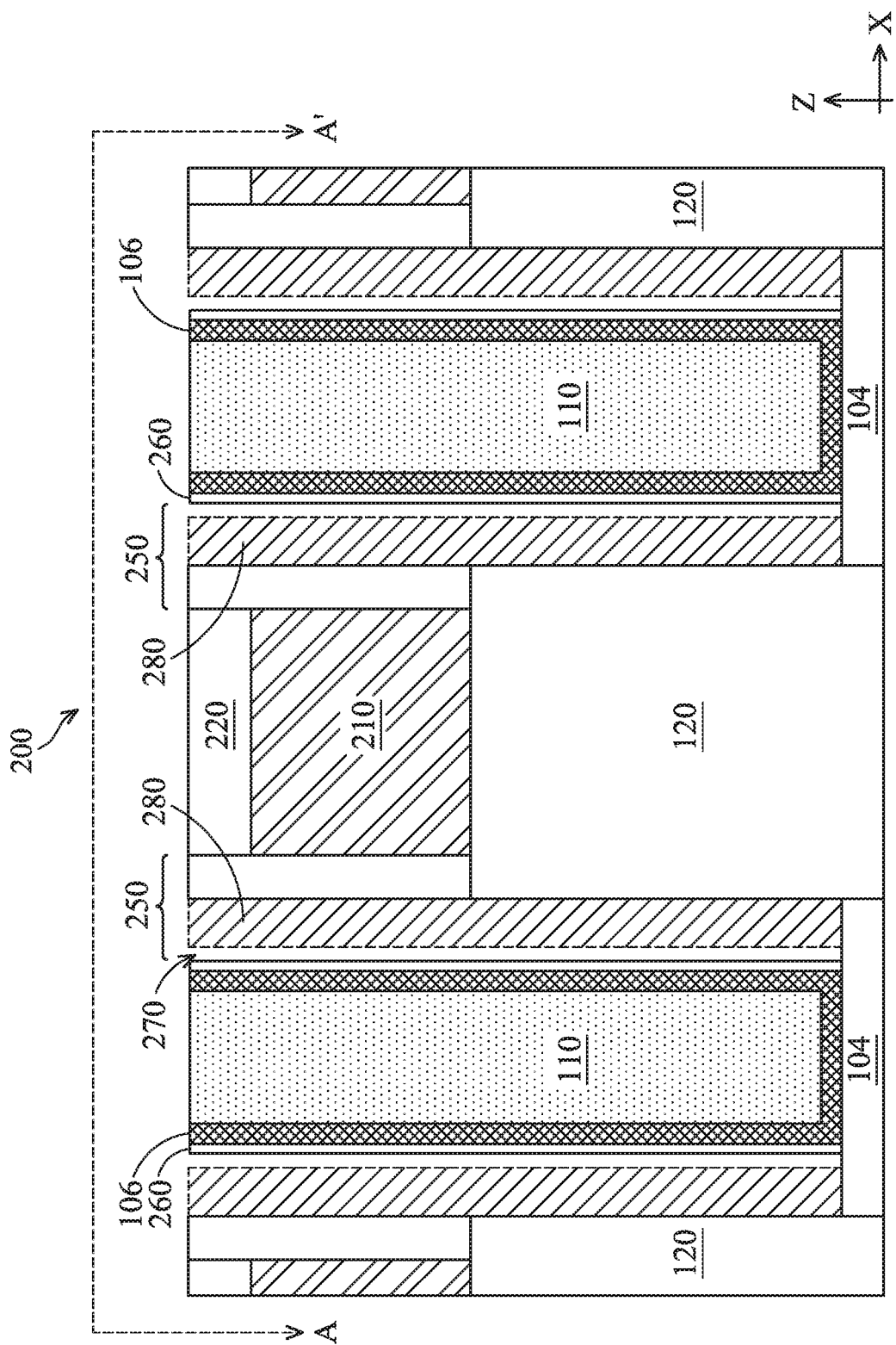
FIG. 2A is a cross-sectional view of an embodiment of a FinFET device at various stages of fabrication according to various aspects of the present disclosure.

FIG. 2A is a diagrammatic fragmentary cross-sectional side view of a portion of a semiconductor device 200 along an X-Z plane. In some embodiments, the cross-sectional cut is taken corresponding to the location of a cutline A-A' shown in FIG. 1. Since the cutline A-A' extends in the X-direction, FIG. 2A may also be referred to as an X-cut. For reasons of consistency and clarity, component that are similar to those appearing in FIG. 1 are labeled the same in FIG. 2A.

FIG. 2A illustrates portions of the fin structures 104, as well as the epi-layers 120 grown on the fin structures 104. An interlayer dielectric (ILD) structure 210 is disposed over the epi-layers 120. A helmet structure 220 is disposed over the ILD structure 210.

Meanwhile, gate dielectric layers 106 are disposed over the fin structures 104. In some embodiments, the gate dielectric layers 106 include a high-k gate dielectric (e.g., a material having a dielectric constant greater than about 4). As non-limiting examples, the high-k gate dielectric may include: hafnium oxide, zirconium oxide, aluminum oxide, hafnium dioxide-alumina alloy, hafnium silicon oxide, hafnium silicon oxynitride, hafnium tantalum oxide, hafnium titanium oxide, hafnium zirconium oxide, the like, or combinations thereof. It is understood that the gate dielectric layers 106 may also include (or is formed over) an interfacial layer (IL), which may include silicon oxide as a non-limiting example. For reasons of simplicity, the IL is not separately shown herein. The gate dielectric layers 106 may each have a U-shape, since they may be formed by filling the opening left due to the removal of the dummy gate structures. The gate electrodes 110 are then formed over the gate dielectric layers 106. The gate electrodes 110 and the gate dielectric layers 106 may collectively be referred to as gate structures, for example high-k metal gate (HKMG) structures.

Gate spacer structures 250 are disposed on sidewalls of the gate dielectric layers 106. The gate spacer structures 250 may be formed by patterning the one or more dielectric layers 115 discussed above with reference to FIG. 1. In some embodiments, the gate spacer structure 250 may include a dielectric spacer 260 disposed directly on the sidewalls of the gate electrode 110, an air spacer 270 disposed adjacent to the dielectric spacer 260, and a dielectric spacer 280 disposed adjacent to the air spacer 270. The dielectric spacer 260 is substantially thinner than the air spacer 270 and the dielectric spacer 280 in the X-direction, for example multiple times thinner. In some embodiments, the air spacers 270 are formed after the HKMG structures are formed. However, it is understood that this is not intended to be limiting, as the air spacers 270 may be formed prior to the formation of the HKMG structures as well.

Since the air spacer 270 is disposed between the dielectric spacer 260 and the dielectric spacer 280, the dielectric spacer 260 may also be referred to as an inner dielectric spacer, the dielectric spacer 280 may also be referred to as an outer dielectric spacer, and the air spacer 270 may also be referred to as a middle spacer. While the air spacer 270 includes air (which is technically a dielectric material), the dielectric spacer 260 and the dielectric spacer 280 may each include one or more dielectric materials that are different from air, such as silicon carbon nitride (SiCN), silicon carbon oxynitride (SiCON), or a suitable low-k dielectric material (e.g., a dielectric material having a dielectric constant less than about 4) that is not air.

Figure 3:
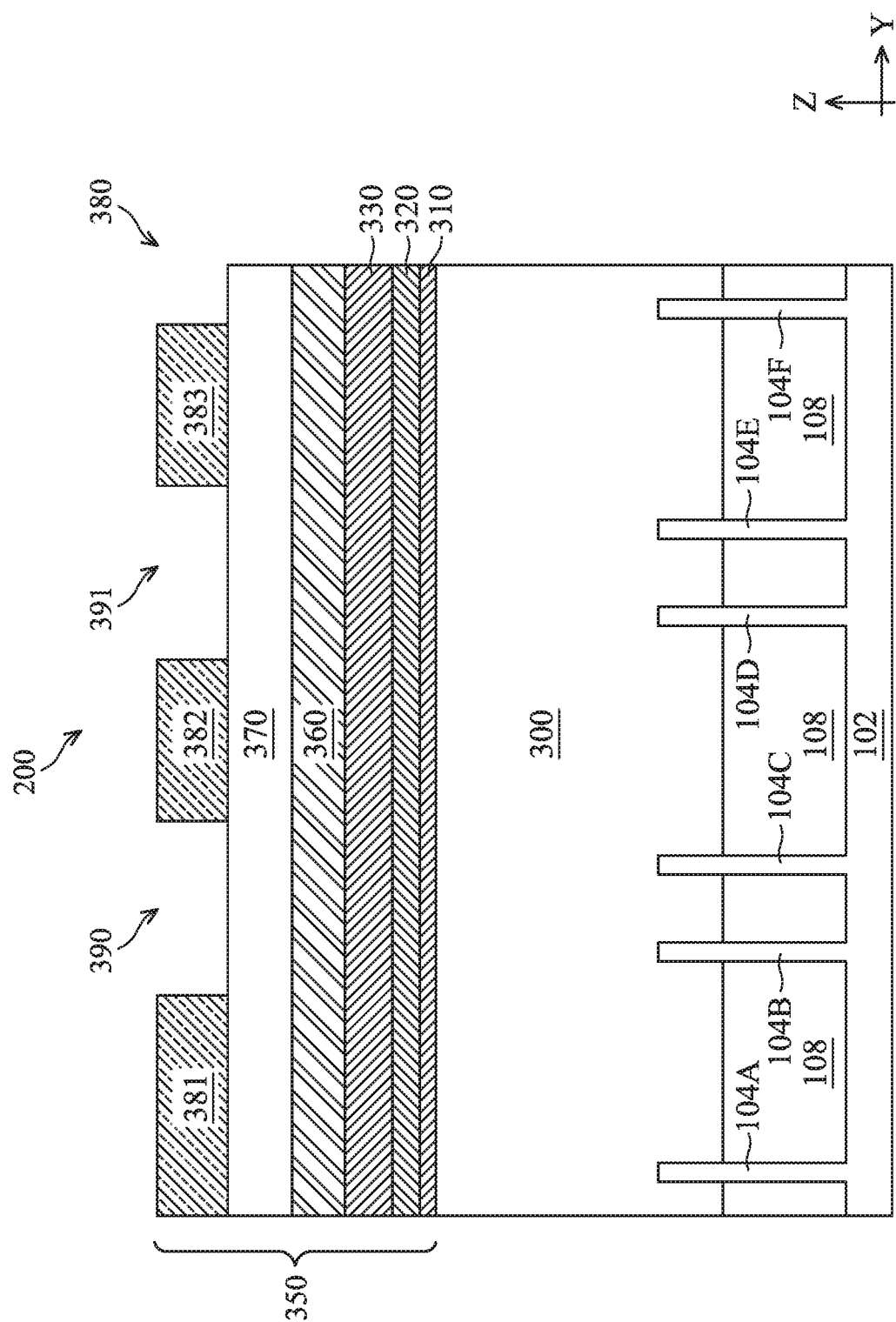

In some embodiments, the air spacer 270 may be formed by removing a non-air dielectric material that may be initially formed in place of the air spacers 270. Such a dielectric material may have a different material composition than the spacers 260 and 280. For example, the dielectric material may include silicon oxide, while the dielectric spacer 260 and the dielectric spacer 280 may include SiCN, SiCON, or a low-k material. Subsequently, the air spacer 270 may be formed by selectively removing the dielectric material without substantially affecting the dielectric spacer 260 and the dielectric spacer 280. Due to their material composition differences, an etching process may be performed with etching selectivity between the dielectric material to-be-removed and the other materials such as the dielectric spacers 260 and 280. As will be discussed in more detail below, FIG. 3 illustrates an embodiment of such a dielectric material before it is removed to form the air spacer 270.

Still referring to FIG. 2A, the air spacer 270 has a high aspect ratio (e.g., greater than 10:1), which a ratio of its depth (measured in the Z-direction) divided by its width (measured in the X-direction). Such a high aspect ratio means that the air spacer 270 is difficult to form, and its formation may inadvertently cause damage to the rest of the semiconductor device 200 if proper care has not been taken to avoid it.

Figure 2B:
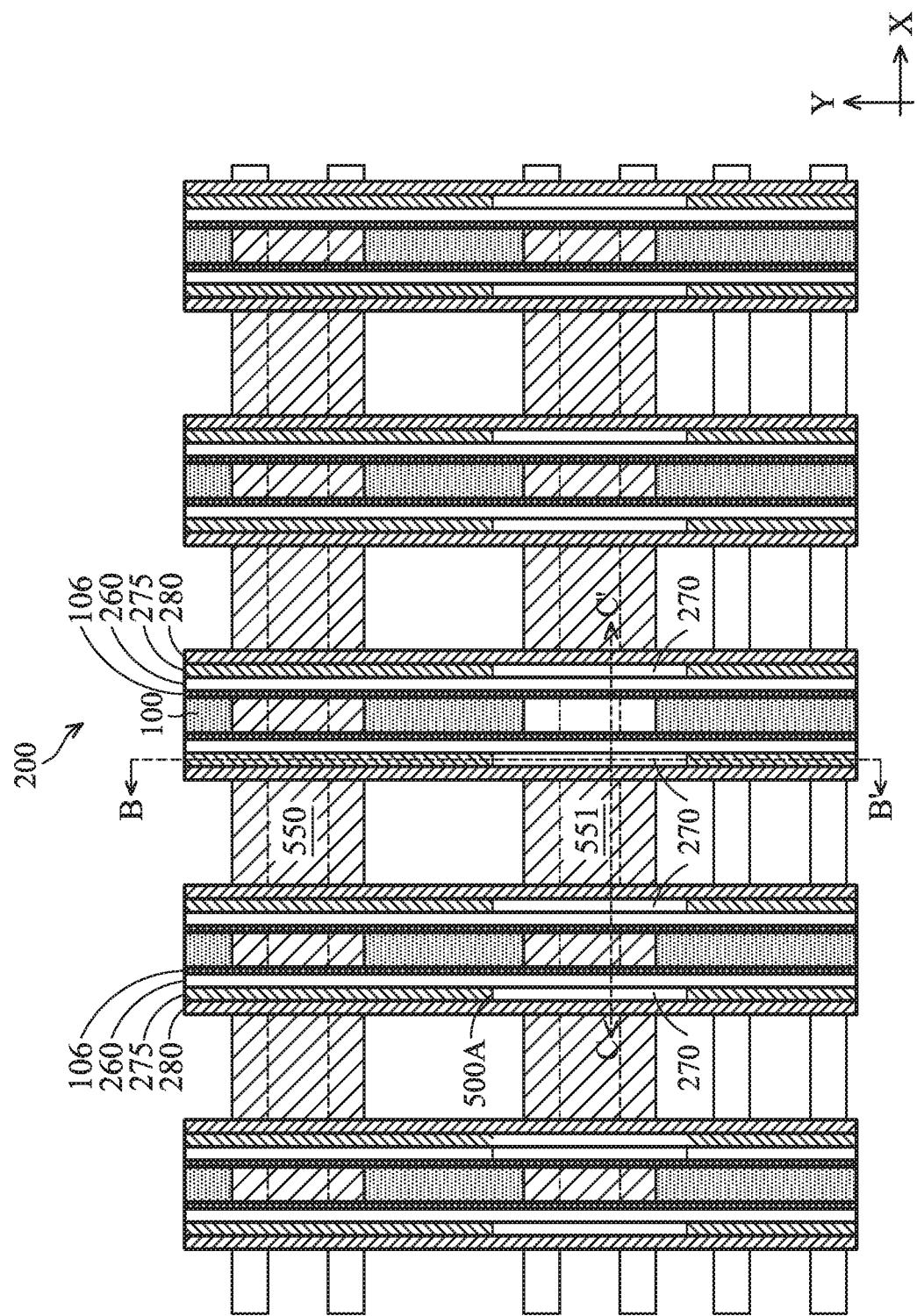
FIG. 2B is a top view of an embodiment of a FinFET device at various stages of fabrication according to various aspects of the present disclosure.

FIG. 2B illustrates a top view of the semiconductor device 200 to further illustrate the concepts of the present disclosure. It is understood that the cross-sectional view of FIG. 2A is taken along a cutline C-C' of FIG. 2B. As shown in FIG. 2B, the gate structures including the gate dielectric layers 106 and the gate electrodes 110 are formed over active regions 550-551, which may include fin structures. The gate dielectric layers 106 and the gate electrodes 110 each extend in the Y-direction, while the active regions 550-551 each extend in the X-direction. Gate spacers 260, 275, and 280 are also formed on the sidewalls of the gate dielectric layers 106. However, portions of the gate spacers 275 are removed so as to form the air spacers 270 in selected regions. The gate spacers 275 and the air spacers 270 form a boundary or interface 500A, which is one of the unique physical characteristics of the present disclosure. As will be discussed in more detail below, the selective formation of the air spacers 270 will improve device fabrication and performance.

According to the various aspects of the present disclosure, the formation of the air spacers 270 involves using lithography processes to pattern a hard mask structure, which is then used to define regions of a wafer where air spacers such as the air spacers 270 are formed. Such a selective air spacer formation scheme helps avoid many of the problems associated with conventional air spacer formation processes, as discussed in more detail below.

FIGS. 3-7 are diagrammatic fragmentary cross-sectional side views of a portion of the semiconductor device 200 along a Y-Z plane. In some embodiments, the cross-sectional cut is taken corresponding to the location of a cutline B-B' shown in FIG. 1. Since the cutline B-B' extends in the Y-direction, FIGS. 3-7 may also be referred to as Y-cuts. For reasons of consistency and clarity, component that are similar to those appearing in FIG. 1 are labeled the same in FIGS. 3-7.

Referring to FIG. 3, a plurality of fin structures 104A-104F protrude vertically out of the substrate 102. Some of these fin structures 104A-104F may be fin structures for NFETs, while some other of these fin structures 104A-104F may be fin structures for PFETs. It is understood that epi-layers such as the epi-layers 120 (see FIG. 1 or FIG. 2A) may be epitaxially grown on the fin structures 104A-104F. However, since the cross-sectional cut in FIG. 3 is taken at the cutline B-B' (see FIG. 1)—which is a region outside of where the epi-layers 120 are grown—the epi-layers are not visible in FIG. 3. The isolation structure 108 (e.g., STI) is disposed over the substrate 102 vertically in the Z-direction and between the fin structures 104A-104F laterally in the Y-direction.

A dielectric spacer layer 300 is disposed over the isolation structure 108 and over the fin structures 104A-104F vertically in the Z-direction. The dielectric spacer layer 300 may be formed by patterning one of the dielectric layers 115 discussed above. In some embodiments, the dielectric spacer layer 300 includes a material composition similar to (or the same as) the isolation structure 108. Due to their substantially similar (or even identical) material compositions, the etching of the dielectric spacer layer 300 may also risk inadvertently damaging the isolation structure 108, if proper care has not been taken to avoid it. In some embodiments, the dielectric spacer layer 300 may include silicon oxide. In other embodiments, the dielectric spacer layer 300 may each include a low-k dielectric material.

The dielectric spacer layer 300 is also the dielectric layer that is disposed between the dielectric spacer 260 and the dielectric spacer 280 of FIG. 2A. FIGS. 3-7 and the discussions below explain how the dielectric spacer layer 300 is at least partially removed to form the air spacers 270 of FIG. 2A according to various aspects of the present disclosure. Again, due to the location of the Y-cut (e.g., along the cutline B-B' of FIG. 1) corresponding to the cross-sectional view of FIG. 3, the metal gate electrode itself or the epi-layers may not be directly visible in FIG. 3.

Still referring to FIG. 3, a hard mask layer 310 is formed over the dielectric spacer layer 300, a hard mask layer 320 is formed over the hard mask layer 310, and a hard mask layer 330 is formed over the hard mask layer 320. The hard mask layer 310 has a different material composition than the gate electrode 110 (see FIGS. 1-2), such that an etching selectivity can be configured to exist between the hard mask layer 310 and the gate electrode 110. In some embodiments, the etching selectivity between the hard mask layer 310 and the gate electrode 110 is greater than or equal to 2:1, meaning that the etching rate for the hard mask layer 310 is at least twice as fast as the etching rate for the gate electrode 110 in an etching process (or vice versa).

The hard mask layer 330 has a different material composition than the hard mask layer 320, such that an etching selectivity can be configured to exist between the hard mask layer 330 and the hard mask layer 320. In some embodiments, the etching selectivity between the hard mask layer 330 and the hard mask layer 320 is greater than or equal to 2:1, meaning that the etching rate for the hard mask layer 330 is at least twice as fast as the etching rate for the hard mask layer 320 in an etching process (or vice versa). In some embodiments, the etching selectivity between the hard mask layer 330 and the hard mask layer 310 is also greater than or equal to 2:1

In some embodiments, the hard mask layer 310 may include silicon nitride, silicon oxide, or silicon oxynitride, the hard mask layer 320 may include silicon nitride, silicon oxide, or silicon oxynitride, and the hard mask layer 330 may include silicon nitride, silicon oxide, or silicon oxynitride.

A tri-layer photoresist 350 is formed over the hard mask layer 330. The tri-layer photoresist 350 may include a bottom layer 360, a middle layer 370, and a top layer 380. In some embodiments, the bottom layer 360 includes an anti-reflective coating material and as such may be referred to as a bottom anti-reflective coating (BARC) layer. Using a lithography process—which may include one or more steps such as photoresist coating, exposing, post-exposure baking, developing, hard baking, etc.—the top layer 380 may be patterned into a plurality of segments such as the segments 381, 382, and 383. The segments 381-383 define openings 390 and 391.

Figure 3A:
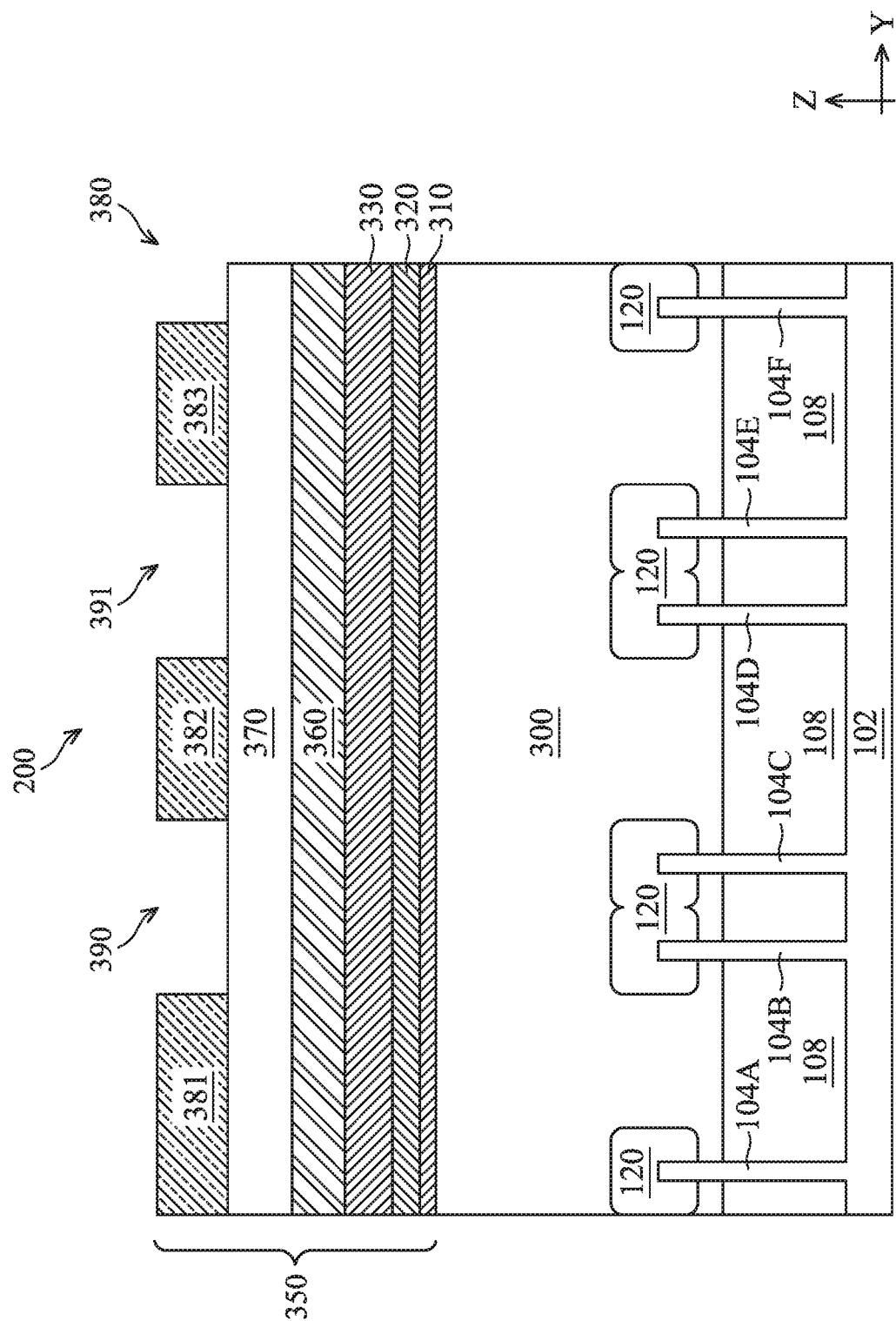

FIG. 3A illustrates a superimposed cross-sectional view of different cross-sections of the semiconductor device 200. In addition to the cross-sectional view of FIG. 3, FIG. 3A superimposes epi-layers 120 that are formed on fin structures 104A-104F. Since the epi-layers 120 are formed outside of the gate structure, the epi-layers 120 are not directly visible in the cross-sectional view of FIG. 3. FIG. 3A therefore aids the reader in understanding the relative locations and dispositions of various layers by illustrating the epi-layers 120.

Referring now to FIG. 4, a hard mask etching process 400 is performed to the semiconductor device 200. The etching process 400 may include a wet etching process in some embodiments or a dry etching process in other embodiments. The patterns defined by the segments 381-383 of the top layer 380 of the tri-layer photoresist 350 are transferred to the bottom layer 360, which is used to pattern the hard mask layers 330 and 320 below. It is understood that two or more type of etchant may be used in the etching process, for example a first type of etchant may be used in etching the hard mask layer 330, and a second type of etchant may be used to etch the hard mask layer 320. In any case, the openings 390 and 391 are etched vertically through the hard mask layers 330 and 320 and expose portions of the hard mask layer 310. Due to the etching selectivity between the hard mask layer 310 and the hard mask layers 320 and 330, the hard mask etching process 400 can "open" the hard mask layers 330 and 320 without substantially affecting the hard mask layer 310. In this manner, the hard mask layer 310 may serve as an etching-stop layer for the hard mask etching process 400 herein.

Figure 5:
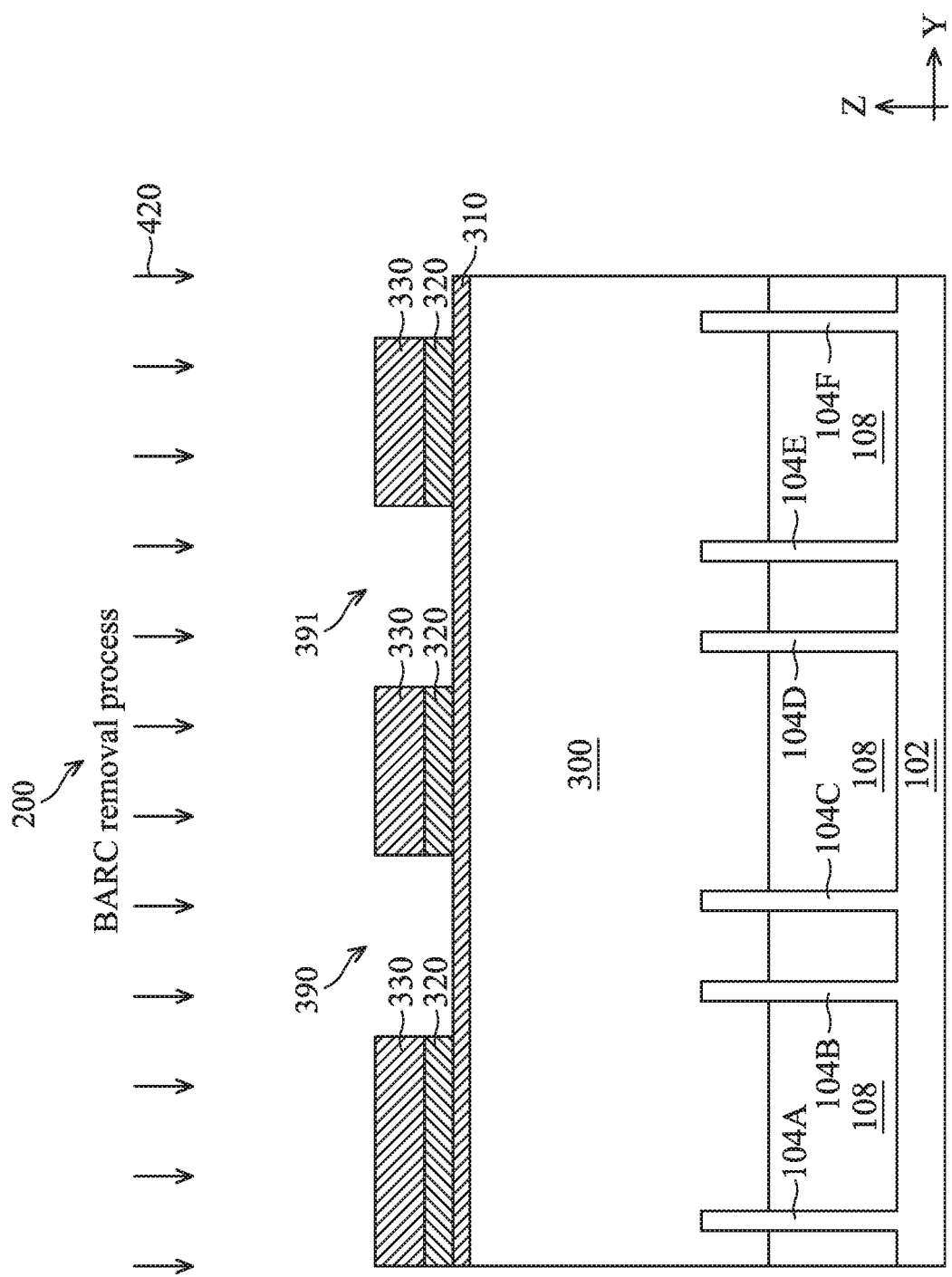

Referring now to FIG. 5, a BARC removal process 420 is performed to the semiconductor device 200 to remove the remaining segments of the bottom layer 360. In some embodiments, the BARC removal process 420 includes photoresist stripping or ashing process. Note that the BARC removal process 420 is performed while the hard mask layer 310 is still in place. Thus, the hard mask layer 310 serves as a protective layer for the layers below during the BARC removal process 420, which prevents the layers therebelow from being damaged during the BARC removal process 420.

Figure 6:
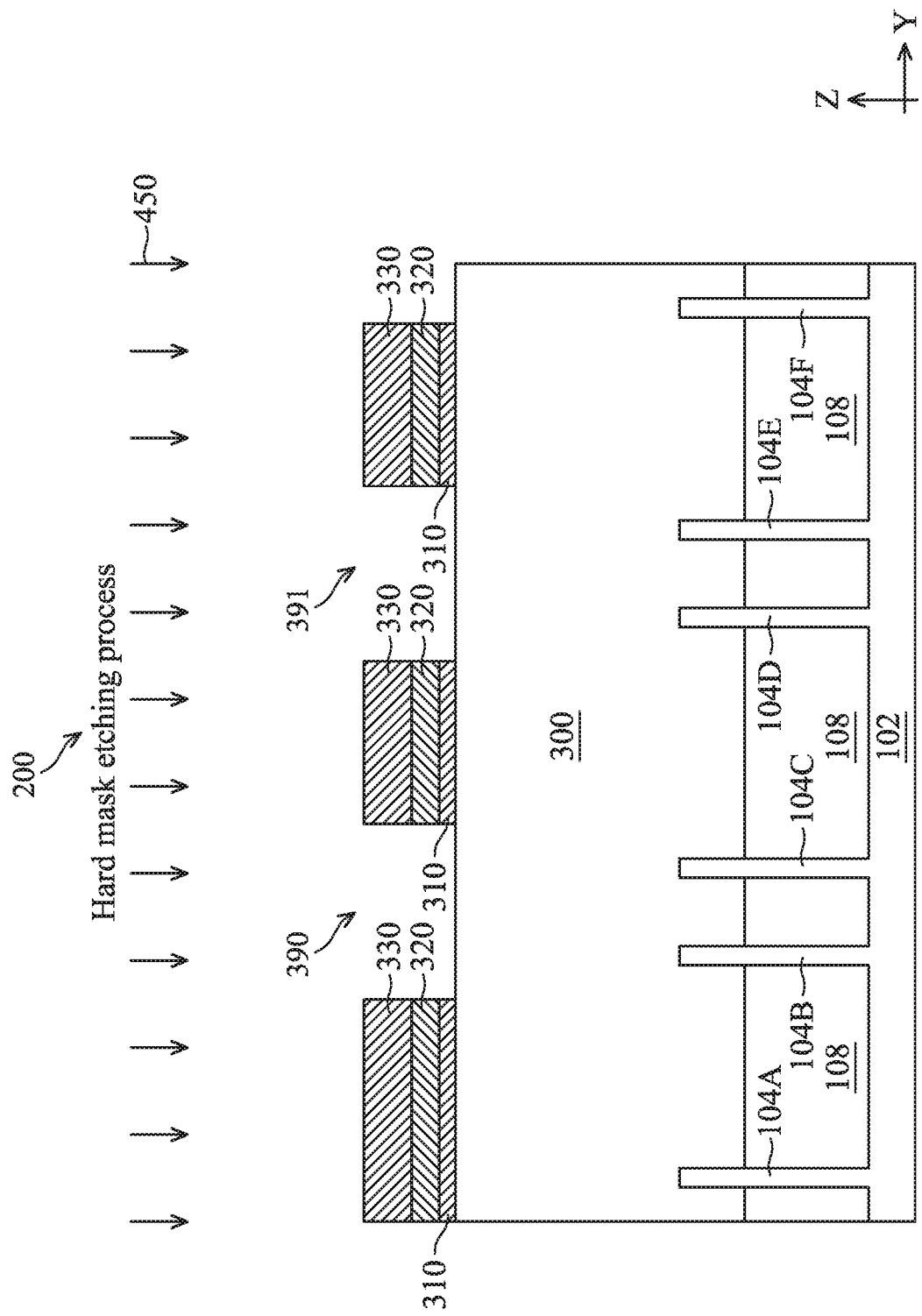

Referring now to FIG. 6, a hard mask etching process 450 is performed to the semiconductor device 200 to etch the openings 390 and 391 vertically through the hard mask layer 310. In other words, the hard mask etching process 450 "opens" the hard mask layer 310, so that regions of the dielectric spacer layer 300 are exposed. Due to the etching selectivity between the hard mask layers 310 and 330, the hard mask etching process 450 can substantially remove the hard mask layer 310 while the hard mask layer 330 remains substantially unaffected. In some embodiments, the hard mask etching process 450 includes a wet etching process. In other embodiments, the hard mask etching process 450 includes a dry etching process.

Figure 7:
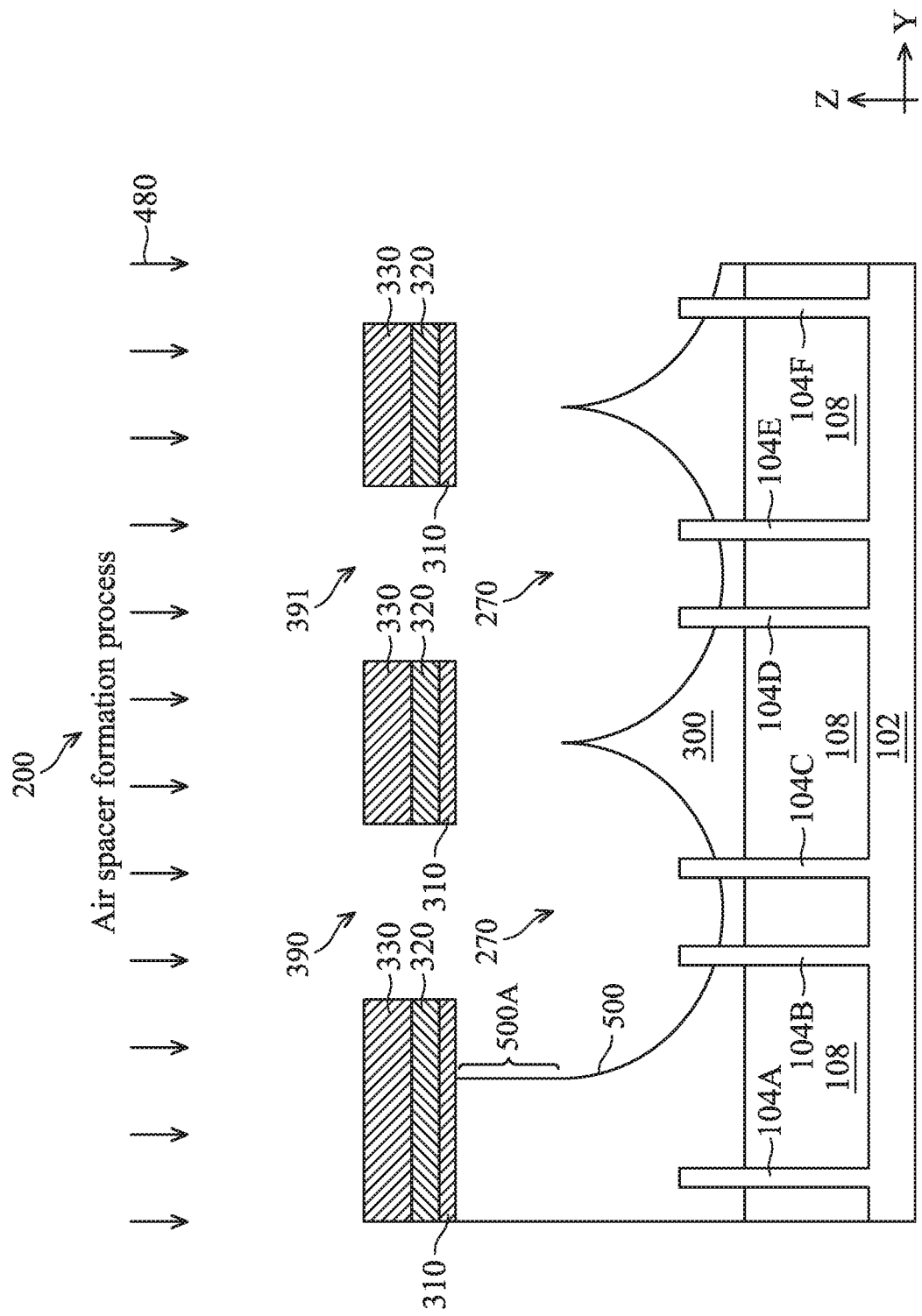

Referring now to FIG. 7, an air spacer formation process 480 is performed to the semiconductor device 200. With the remaining portions of hard mask layers 310-330 serving as protective masks, the air spacer formation process 480 may include a wet etching process or a dry etching process to etch away portions of the dielectric spacer layer 300 that are unprotected (e.g., exposed by the openings 390-391). In some embodiments, the etching processes may use HF, $H_2O$, He, and/or $N_2$ as etchants.

The removal of the dielectric spacer layer 300 results in the air spacer 270. The air spacers 270 may at least partially expose a subset of the fin structures, for example the top surfaces and part of the side surfaces of the fin structures 104B, 104C, 104D, and 104E. One of the unique physical characteristics of the air spacer 270 formed by the present disclosure is that it may have a boundary 500 that has a vertical component 500A. In other words, the remaining portion of the dielectric spacer layer 300 and the air spacer 270 may share a boundary 500 that extends partially vertically in the Z-direction. Note that the vertical boundary 500A may not be linear but may have a semi-circular profile (or otherwise curved) or a trapezoidal profile instead. In addition, in real world devices, the vertical boundary 500A may not be perfectly linear, or semi-circular, or trapezoidal. Instead, the vertical boundary 500A may have dips, bumps, protrusions, or otherwise exhibit surface topography variations or roughness. However, the overall profile of the vertical boundary 500A may still resemble a line, a semicircle (or an arc), or a trapezoid.

Such a vertical boundary 500A may be formed as a result of using the hard mask layers 310-330 to define the air spacers 270. In other words, with the hard mask layers 310-330 serving as protective masks, the etching process used to remove the dielectric spacer layer 300 results in the vertical boundary 500A. In comparison, conventional air spacers may lack such a vertical boundary 500A, because conventional air spacer formation processes do not use hard masks to define the air spacers.

The vertical boundary 500A exists because the air spacers 270 are selectively formed for devices that need them, but not for devices that do not need them. For example, transistors associated with the fin structures 104B-104F may be transistors in IC applications where the benefit of having air spacers outweigh the downsides. These transistors may be transistors in IC applications where speed is an important concern, such as ring oscillators. Other example devices that may utilize air spacers may include SRAM devices, logic devices such as row/column decoders, shift registers, etc. Transistor speed is inversely correlated with a time constant, which is a product of resistance times capacitance. Lowering the dielectric constant (e.g., by implementing air spacers) would lower the capacitance, which in turn would reduce the time constant and increase speed. Hence, it can be seen that air spacers are best used for applications where transistor speed needs to be fast.

On the other hand, air spacers are not formed for transistors associated with the fin structure 104A, because the transistors associated with the fin structure 104 are in IC applications where speed is not a critical concern. For example, transistor speed may not be a big concern for memory devices such as SRAM devices, and thus SRAM devices may not need air spacers. In more detail, the implementation of air spacers may pose a certain amount of risk, for example they may lead to the wiggling or even collapse of gate structures. In addition, the fabrication processes performed to form air spacers may cause inadvertent etching damage to certain device components (e.g., STI structures underneath the air spacers) and/or generate undesirable etching byproduct or waste, which could also degrade device performance. Therefore, the inventors of the present disclosure recognized that rather than treating all transistors the same (e.g., as if they all need air spacers), it is more optimal to selectively implement air spacers for transistor devices (e.g., associated with the fin structures 104B-104F) in applications where speed is an important concern, because for these devices, the benefit of having air spacers outweigh the risks. However, for transistor devices (e.g., associated with the fin structure 104A) where speed is not an important concern, the present disclosure recognizes that any potential benefit derived from air spacers may not outweigh the risks of their implementation. As such, the present disclosure does not form air spacers for these transistor devices.

It is understood that although the embodiment discussed above with reference to FIGS. 3-7 utilize three hard mask layers (e.g., hard mask layers 310, 320, and 330) to define the region in which the air spacers are to be formed, two hard mask layers may also be used to define the region for the air spacers according to other embodiments of the present disclosure. For example, the hard mask layer 330 may be omitted in some embodiments.

Figure 8:
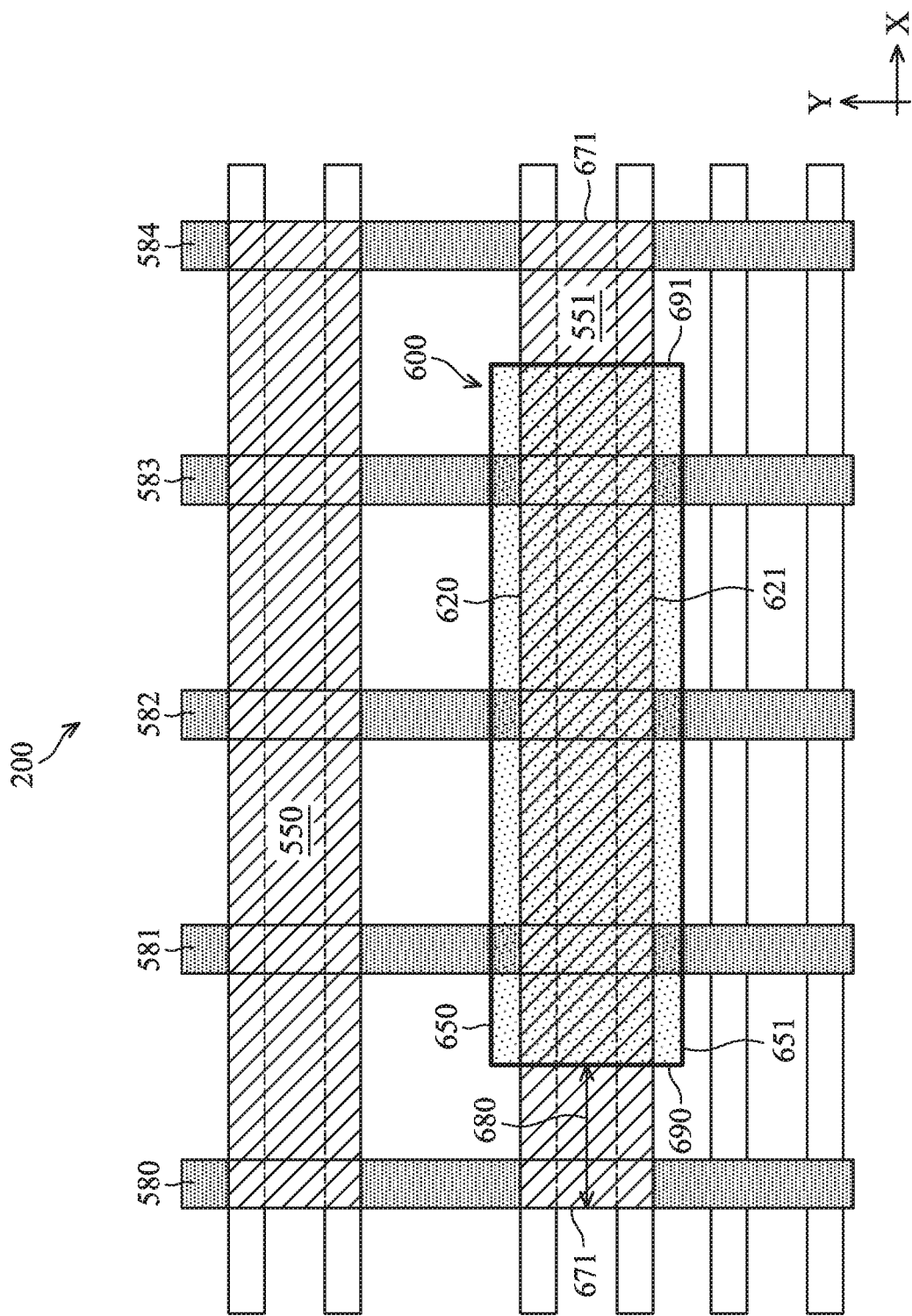
FIGS. 8-9 are top views of a portion of an IC layout according to various aspects of the present disclosure.

FIG. 8 illustrates a diagrammatic fragmentary top view of a portion of an IC layout of the semiconductor device 200. FIG. 8 helps illustrate how lithography masks can be defined for generating the hard mask layers 310-330 (or for defining the regions of the air spacers 270). In more detail, the top view of FIG. 8 illustrates example active regions 550-551, where they each have a shape of an elongated rectangle that extends in the X-direction. The top view of FIG. 8 also illustrates example gate structures 580-584, where they each have a shape of an elongated rectangle that extends in the Y-direction. The gate structures 580-584, when formed, may be formed as HKMG structures and may each include a HKMG gate structure having a metal gate electrode similar to the gate electrode 110 and a high-k gate dielectric layer similar to the high-k gate dielectric layer 106 discussed above. For reasons of simplicity, the gate electrodes and the gate dielectric layers of the gate structures 580-584 are not separately or individually illustrated herein, though it is understood that their depositions may be similar to what is shown in FIG. 2B.

The layout information for the active regions 550-551 and the gate structures 580-584 may be extracted from an IC design layout, which may be received from an IC design house and may be in the form of a Graphic Data System (GDS) file. The GDS file and/or other data files received from the IC design house may also indicate the types of applications associated with transistor devices in different regions. Based on this information, lithography masks are generated to implement hard mask layers (such as the hard mask layers 310-330) that define the regions for air spacer formation. For example, FIG. 8 illustrates an area 600 that corresponds to an opening defined by the hard mask layers, so that etching may be performed through such an opening to form the air spacers. For example, the area 600 may correspond to one of the openings 390 or 391 discussed above with reference to FIGS. 3-7.

The area 600 may be defined as follows. First, a determination is made as to which IC devices should have air spacers implemented (e.g., ring oscillators or other high-speed applications), and the corresponding active region for these IC devices is located. For the purpose of providing an example, suppose the active region 551 is one such active region. Next, the X-direction boundaries 620 and 621 of the active region 551 are "pushed outwardly" or expanded in the Y-direction by a distance of 640. In some embodiments, the distance 640 is greater than about 0 and less than about 50 nanometers (nm). This range for the distance 640 helps improve the resulting device while minimizing the possibilities of the gate structures 581-583 wiggling or collapsing. After this operation, the area 600 has X-direction boundaries 650 and 651.

The Y-direction boundaries 670 and 671 of the active region 551 are also "pushed inwardly" or contracted in the X-direction by a distance of 680. In some embodiments, the distance 680 is greater than about 20 nm and less than about 50 nanometers (nm). This range for the distance 680 helps improve the resulting device while minimizing the possibilities of the gate structures 581-583 wiggling or collapsing. After this operation, the area 600 has Y-direction boundaries 690 and 691.

With the area 600 having been defined, lithography masks may be generated to define the hard mask layers. For example, the hard mask layers would correspond to regions of the IC layout other than the area 600. Alternatively stated, the hard mask layers would define an opening corresponding to the area 600. Since the air spacer etching process is performed through the area 600 (or the opening corresponding to the area 600), air spacers may be selectively formed in the area 600, but not outside of the area 600. Since the transistors inside the area 600 value speed more than the transistors outside the area 600, the selective implementation of air spacers in the area 600 will help optimize the performance for different types of transistor devices (e.g., both for transistors inside the area 600 and outside of it).

As discussed above, the selective implementation of air spacers of the present disclosure also results in unique physical characteristics, such as the vertical boundary 500A discussed above. In the top view of FIG. 8, the vertical boundary 500A would occur somewhere at or near the boundaries 650 or 651 for each of the gate structures 581-583. In more detail, the gate structures 580-584 would each have dielectric gate spacers formed on their sidewalls, where the dielectric gate spacers each extend in the Y-direction.

Figure 9:
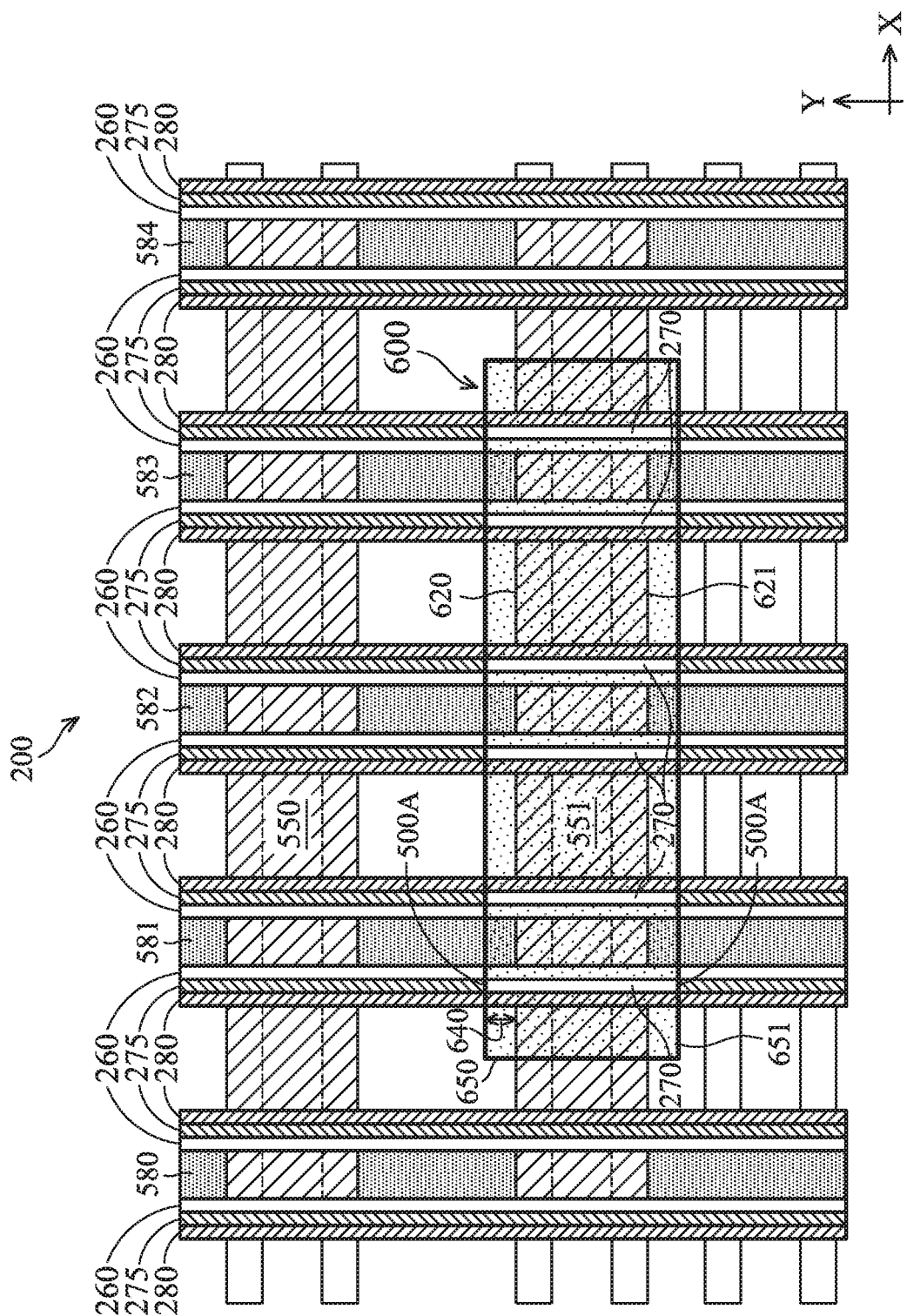

For the purposes of providing a simple illustration, referring now to FIG. 9, where example dielectric gate spacer 260, 275, and 280 are shown as the gate spacers for the gate structures 580-584 in a top view. Specifically, the dielectric gate spacers 260 are disposed directly on sidewalls of each of the gate structures 580-584, the dielectric spacers 275 are disposed on the sidewalls of the dielectric spacers 260, and the dielectric spacers 280 are disposed on the sidewalls of the dielectric spacers 275.

However, within the area 600, air spacers 270 (disposed between the gate dielectric spacers 260 and 280) are formed as air spacers for the gate structures 581-583. This is because the etching process used to form the air spacers 270 are performed through the hard mask opening corresponding to the area 600. As such, portions of the dielectric spacer 275 within the area 600 are etched away to form the air spacers 270. Meanwhile, portions of the dielectric spacer 275 outside the area 600 still remain after the formation of the air spacers 270, because they are protected by the hard mask layers and are not etched. As such, vertical boundaries 500A of the air spacers 270 are formed at or near the boundaries 650/651 of the area 600. As shown in FIG. 9, each vertical boundary 500A is a demarcation between the air spacer 270 and the remaining dielectric spacer 275.

The gate structures 580 and 584 have no air spacers, since they may belong to the type of devices (e.g., SRAM) where air spacers are not needed. Similarly, portions of the gate structure 581-583 that are outside the area 600 may also belong to the type of devices where air spacers are not needed, or at least the benefit of air spacers does not outweigh potential risks. The portions of the gate structures 581-583 within the area 600 belong to devices where the benefit of having air spacers outweigh the risks, for example they may belong to high speed devices such as ring oscillators.

Figure 10:
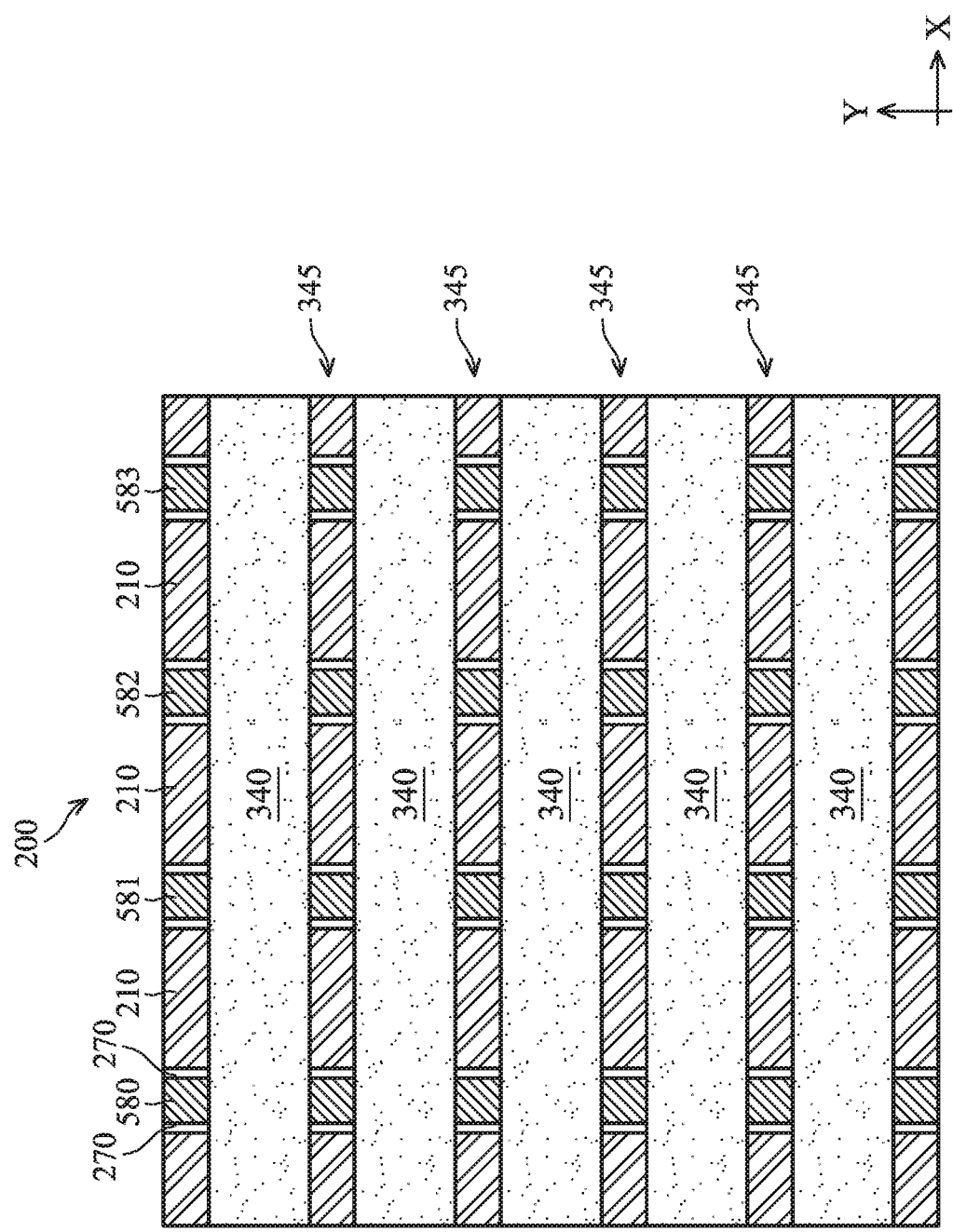
FIGS. 10-11 are top views of a portion of an IC at various stages of fabrication according to various aspects of the present disclosure.

FIG. 10 is a simplified diagrammatic fragmentary top view of the semiconductor device 200 at a stage of fabrication according to embodiments of the present disclosure. At this stage of fabrication, gate structures such as gate structures 580-583 have been formed, which each extend in the Y-direction and are separated from one another in the X-direction by the ILD 210. Air spacers 270 have also been formed on either side of each of the gate structures. The locations of the air spacers 270 are defined at least in part by the hard mask structures 340, which may include the hard mask layers 310, 320, and 330. In other words, the hard mask structures 340 each extend in the X-direction and are separated from one another in the Y-direction, thereby defining openings 345. The air spacers 270 are formed under the openings 345. For reasons of simplicity, the other dielectric gate spacers other than the air spacers 270 are not specifically illustrate herein.

Figure 11:
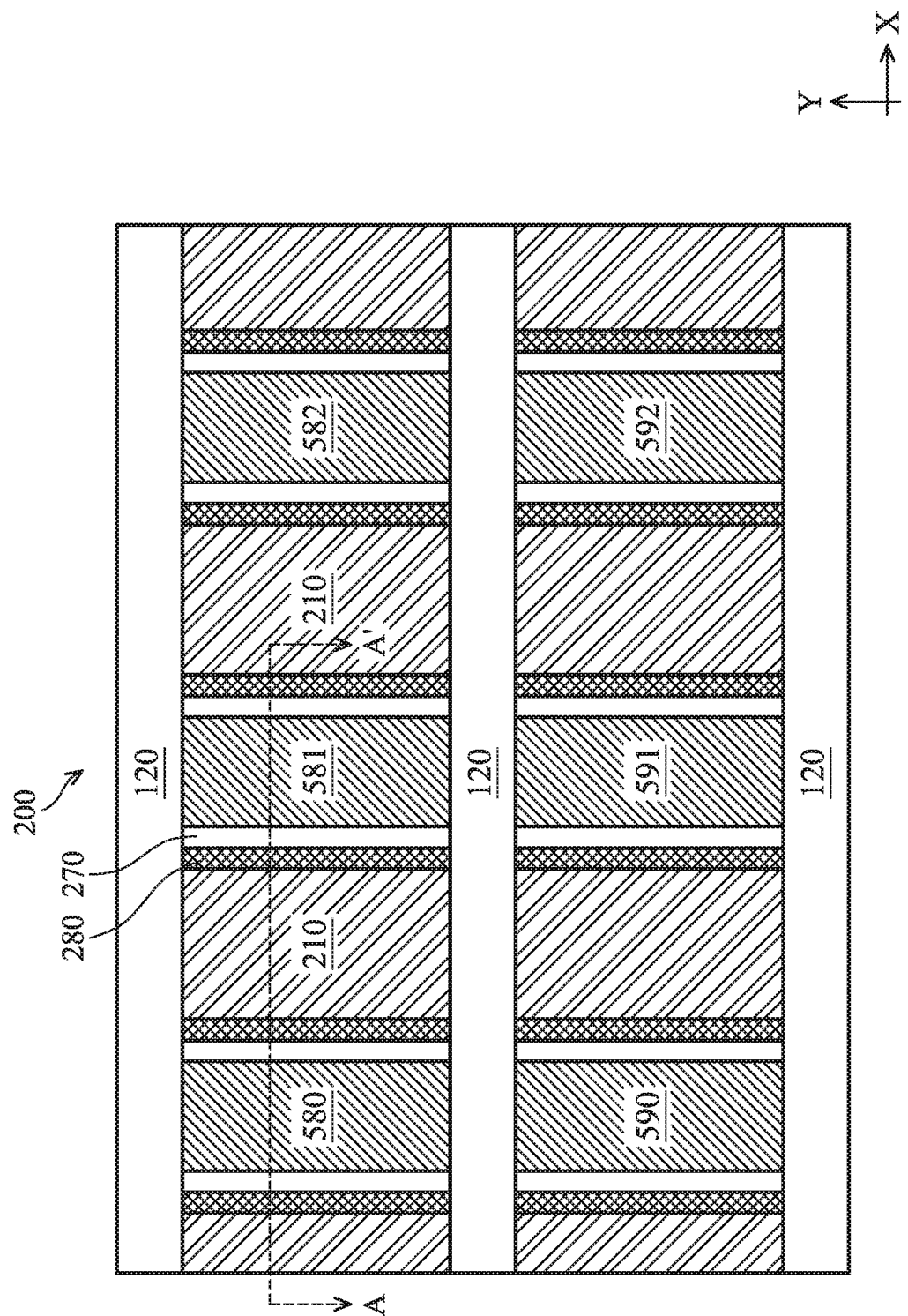

FIG. 11 is a simplified diagrammatic fragmentary top view of the semiconductor device 200 at a stage of fabrication according to embodiments of the present disclosure. FIG. 11 also includes the cut-line A-A' that was shown in FIG. 2A. In other words, the cross-sectional view of FIG. 2A may be obtained by taking the cross-sectional cut along the cut-line A-A' in FIG. 11. However, in the top view shown in FIG. 11, the ILD 210 and the helmet structure 220 that are disposed above the epi-layers 120 are removed, thereby exposing the epi-layers 120.

At this stage of fabrication, the hard mask structures 340 are removed. Air spacers 270 are formed on opposite sides of the gate structures such as gate structures 580-582 and gate structures 590-592. Dielectric gate spacers 280 are also disposed adjacent to the air spacers 270. In other words, the air spacers 270 are disposed between the gate structures 580/581/582 and the dielectric gate spacers 280. The ILD 210 are located between the dielectric gate spacers 280. The epi-layers 120 are disposed between adjacent ones of the gate structures in the Y-direction, for example between gate structures 580 and 590, between gate structures 581 and 591, and between gate structures 582 and 592.

Figure 12:
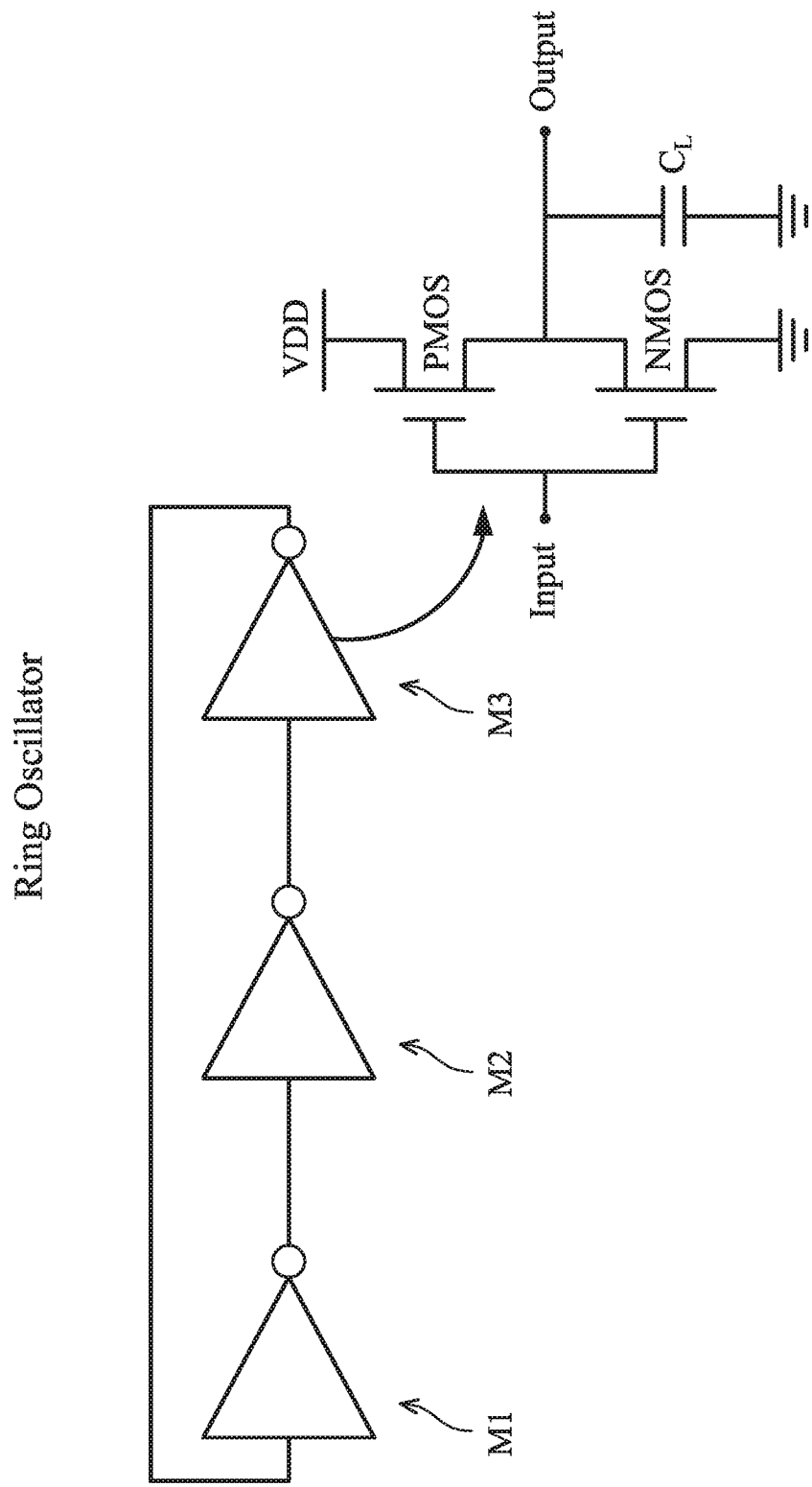
FIG. 12 illustrates a circuit diagram of a ring oscillator.

FIG. 12 illustrates the circuit diagram of a simple ring oscillator to provide an example of a device for which air spacers should be formed according to aspects of the present disclosure. For example, the ring oscillator may include an odd number of inverters, which may be three inverters M1, M2, and M3 in the illustrated embodiment. The output of the inverter M1 is electrically connected to the input of the inverter M2, the output of the inverter M2 is electrically connected to the input of the inverter M3, and the output of the inverter M3 is electrically connected to the input of the inverter M1, thereby forming a loop or ring comprised of the inverters M1, M2, and M3 that are electrically connected in series. In some embodiments, the inverters M1, M2, and M3 may be implemented using CMOS transistors. For example, each of the inverters M1, M2, and M3 may include a PMOS and an NMOS. The gates of the PMOS and the NMOS are connected to each other and serve as the input of the inverter. One of the source/drains of the PMOS is tied to Vdd (e.g., a voltage rail). The other one of the source/drains of the PMOS is tied to one of the source/drains of the NMOS and serves as the output of the inverter. The other one of the source/drains of the NMOS is tied to ground. The capacitance (e.g., the output capacitance of the inverter) is modeled using a capacitor $C_L$. Of course, it is understood that FIG. 12 merely illustrates a simple embodiment of a ring oscillator that is not intended to be limiting. Further, air spacers of the present disclosure may be formed for other suitable devices that are not ring oscillators.

Figure 13:
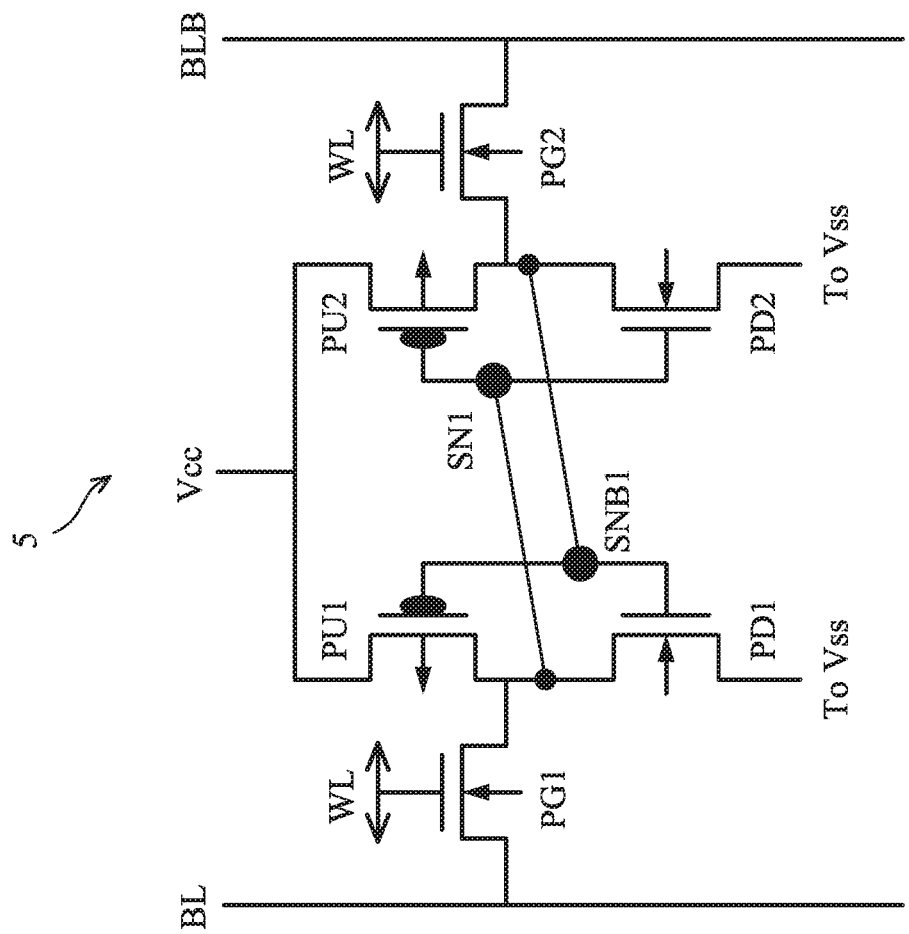
FIG. 13 is a circuit diagram of an SRAM according to various aspects of the present disclosure.

FIG. 13 illustrates a circuit diagram of an SRAM device to provide an example of a device for which air spacers of the present disclosure need not be formed. SRAM device is a type of semiconductor memory that uses bi-stable latching circuity (e.g., flip-flop) to store binary bits of information. FIG. 13 illustrates an example circuit schematic for a single-port SRAM cell (e.g., 1-bit SRAM cell) 5. The single-port SRAM cell 5 includes pull-up transistors PU1, PU2; pull-down transistors PD1, PD2; and pass-gate transistors PG1, PG2. As show in the circuit diagram, transistors PU1 and PU2 are p-type transistors, such as the p-type FinFETs discussed above, and transistors PG1, PG2, PD1, and PD2 are n-type FinFETs discussed above.

The drains of pull-up transistor PU1 and pull-down transistor PD1 are coupled together, and the drains of pull-up transistor PU2 and pull-down transistor PD2 are coupled together. Transistors PU1 and PD1 are cross-coupled with transistors PU2 and PD2 to form a first data latch. The gates of transistors PU2 and PD2 are coupled together and to the drains of transistors PU1 and PD1 to form a first storage node SN1, and the gates of transistors PU1 and PD1 are coupled together and to the drains of transistors PU2 and PD2 to form a complementary first storage node SNB1. Sources of the pull-up transistors PU1 and PU2 are coupled to power voltage Vcc (also referred to as Vdd), and the sources of the pull-down transistors PD1 and PD2 are coupled to a voltage Vss, which may be an electrical ground in some embodiments.

The first storage node SN1 of the first data latch is coupled to bit line BL through pass-gate transistor PG1, and the complementary first storage node SNB1 is coupled to complementary bit line BLB through pass-gate transistor PG2. The first storage node N1 and the complementary first storage node SNB1 are complementary nodes that are often at opposite logic levels (logic high or logic low). Gates of pass-gate transistors PG1 and PG2 are coupled to a word line WL.

Of course, it is understood that FIG. 13 merely illustrates a simple embodiment of an SRAM device that is not intended to be limiting. Further, air spacers of the present disclosure may be formed for other suitable devices that are not SRAM devices.

Figure 14:
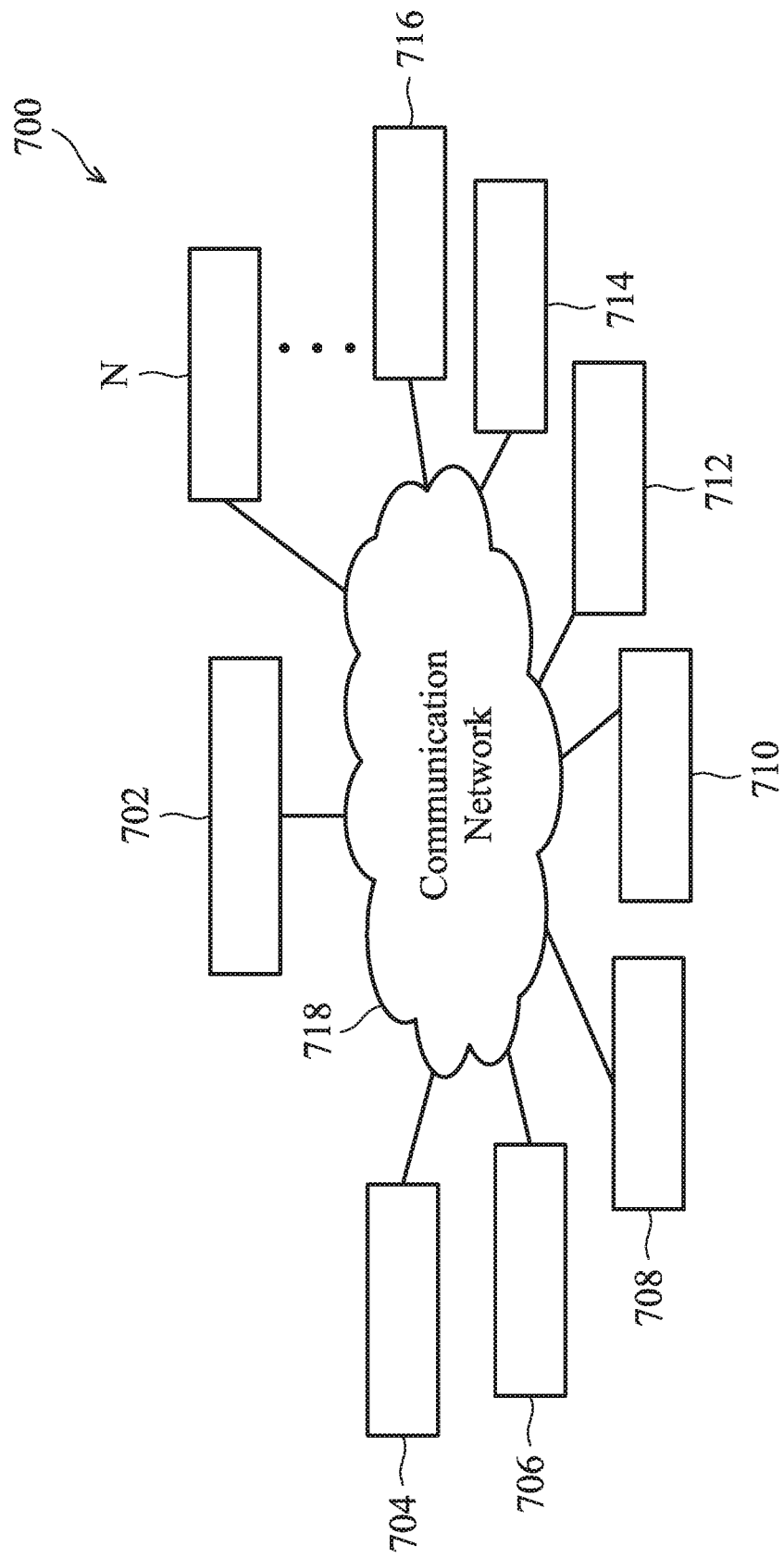
FIG. 14 illustrates an integrated circuit fabrication system according to an embodiment of the present disclosure.

FIG. 14 illustrates an integrated circuit fabrication system 700 according to embodiments of the present disclosure. The fabrication system 700 includes a plurality of entities 702, 704, 706, 708, 710, 712, 714, 716 . . . , N that are connected by a communications network 718. The network 718 may be a single network or may be a variety of different networks, such as an intranet and the Internet, and may include both wire line and wireless communication channels.

In an embodiment, the entity 702 represents a service system for manufacturing collaboration; the entity 704 represents an user, such as product engineer monitoring the interested products; the entity 706 represents an engineer, such as a processing engineer to control process and the relevant recipes, or an equipment engineer to monitor or tune the conditions and setting of the processing tools; the entity 708 represents a metrology tool for IC testing and measurement; the entity 710 represents a semiconductor processing tool; the entity 712 represents a virtual metrology module associated with the processing tool 710; the entity 714 represents an advanced processing control module associated with the processing tool 710 and additionally other processing tools; and the entity 716 represents a sampling module associated with the processing tool 710.

Each entity may interact with other entities and may provide integrated circuit fabrication, processing control, and/or calculating capability to and/or receive such capabilities from the other entities. Each entity may also include one or more computer systems for performing calculations and carrying out automations. For example, the advanced processing control module of the entity 714 may include a plurality of computer hardware having software instructions encoded therein. The computer hardware may include hard drives, flash drives, CD-ROMs, RAM memory, display devices (e.g., monitors), input/output device (e.g., mouse and keyboard). The software instructions may be written in any suitable programming language and may be designed to carry out specific tasks.

The integrated circuit fabrication system 700 enables interaction among the entities for the purpose of integrated circuit (IC) manufacturing, as well as the advanced processing control of the IC manufacturing. In an embodiment, the advanced processing control includes adjusting the processing conditions, settings, and/or recipes of one processing tool applicable to the relevant wafers according to the metrology results.

In another embodiment, the metrology results are measured from a subset of processed wafers according to an optimal sampling rate determined based on the process quality and/or product quality. In yet another embodiment, the metrology results are measured from chosen fields and points of the subset of processed wafers according to an optimal sampling field/point determined based on various characteristics of the process quality and/or product quality.

One of the capabilities provided by the IC fabrication system 700 may enable collaboration and information access in such areas as design, engineering, and processing, metrology, and advanced processing control. Another capability provided by the IC fabrication system 700 may integrate systems between facilities, such as between the metrology tool and the processing tool. Such integration enables facilities to coordinate their activities. For example, integrating the metrology tool and the processing tool may enable manufacturing information to be incorporated more efficiently into the fabrication process, and may enable wafer data from the online or in site measurement with the metrology tool integrated in the associated processing tool.

In some embodiments, the IC fabrication system 700 may be used to obtain an IC layout design (for example from an IC design house in the form of a GDS file), revise the IC layout design according to the discussions above (e.g., determine devices or regions to selectively form air spacers), and facilitate the manufacturing of lithography masks (e.g., lithography masks for defining the hard mask layers), which may involve manufacturing the lithography masks or sending the design for the lithography masks to a third party manufacturer.

Figure 15:
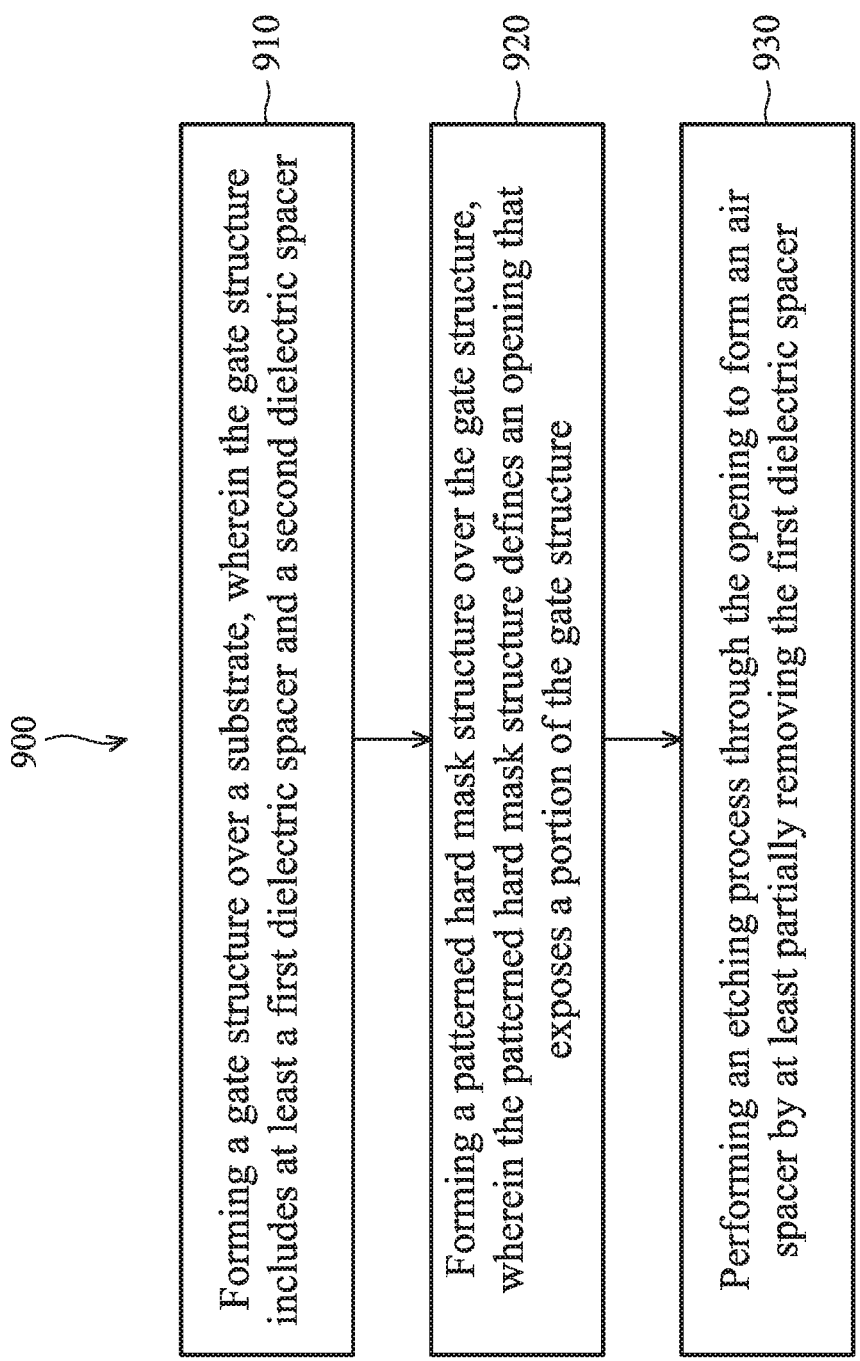
FIG. 15 is a flowchart of a method of fabricating a semiconductor device according to various aspects of the present disclosure.

FIG. 15 is a flowchart illustrating a method 900 of fabricating a semiconductor device according to another embodiment of the present disclosure. The method 900 includes a step 910 of forming a gate structure over a substrate. The gate structure includes at least a first dielectric spacer and a second dielectric spacer. The gate structure, the first dielectric spacer, and the second dielectric spacer each extends in a first horizontal direction in a top view.

The method 900 includes a step 920 of forming a patterned hard mask structure over the gate structure. The patterned hard mask structure defines an opening that exposes a portion of the gate structure. In some embodiments, the forming the patterned hard mask structure comprises forming at least a first hard mask layer and a second hard mask layer formed over the first hard mask layer. An etching selectivity exists between the first hard mask layer and the second hard mask layer.

The method 900 includes a step 930 of performing an etching process through the opening to form an air spacer by at least partially removing the first dielectric spacer. The hard mask structure serves as an etching mask during the etching process. In some embodiments, the etching process forms a vertical boundary between the air spacer and an unremoved portion of the first dielectric spacer. In some embodiments, the vertical boundary includes a segment that has a linear shape, a semi-circular shape, or a trapezoidal shape. In some embodiments, the second dielectric spacer is substantially unaffected by the etching process.

It is understood that additional steps may still be performed before, during, or after the steps 910-930 discussed above. For example, the method 900 may include the following steps: receiving an integrated circuit (IC) layout design; analyzing the IC layout design; based on the analyzing, determining a first region of the IC layout design in which air spacers should be formed and a second region of the IC layout design in which air spacers need not be formed; and facilitating a generation of one or more lithography masks for patterning the hard mask structure, such that the opening defined by the hard mask structure corresponds to the first region but not the second region of the IC layout design. In some embodiments, the analyzing comprises analyzing types of transistor devices located in a plurality of regions of the IC layout design, including the first region and the second region. In some embodiments, the determining comprises determining, that transistor devices located in the first region have a faster speed than transistor devices located in the second region.

In summary, the present disclosure employs various techniques to facilitate the formation of air spacers. For example, an IC layout design that contains multiple types of transistors is analyzed. These different types of transistors may be located in different regions of the IC layout design. Based on the analysis, a determination is made as to which types of transistors should have air spacers implemented, and which types of transistors should not have air spacers implemented. For example, the types of transistors that should have air spacers implemented may include transistors with fast speeds. Thereafter, a hard mask structure may be provided to define an opening that corresponds to the region of the IC layout design where air spacers are to be formed. An etching process is performed through the opening to selectively form air spacers in this region, while the rest of the IC layout design is covered by the hard mask structure and therefore will not form air spacers.

Based on the above discussions, it can be seen that the present disclosure offers advantages over conventional air spacers. However, it is understood that not all advantages are discussed herein, different embodiments may offer different advantages, and that no particular advantage is required for any embodiment. One advantage is that the risk of gate structures wiggling or collapsing may be significantly reduced. This is because the air spacer extends through a portion of the gate structure (or along the sidewall of a portion of the gate structure), rather than along an entirety of the gate structure. Another advantage is that the inadvertent etching damage to other device components such as STI may be prevented or alleviated. Yet another advantage is that the unwanted etching byproducts may be eliminated. Other advantages may include compatibility with existing fabrication processes and the ease and low cost of implementation.

The advanced lithography process, method, and materials described above can be used in many applications, including fin-type field effect transistors (FinFETs). For example, the fins may be patterned to produce a relatively close spacing between features, for which the above disclosure is well suited. In addition, spacers used in forming fins of FinFETs, also referred to as mandrels, can be processed according to the above disclosure.

One aspect of the present disclosure pertains to a semiconductor device. The semiconductor device includes: a substrate and a gate structure disposed over the substrate in a vertical direction. The gate structure extends in a first horizontal direction. An air spacer is disposed adjacent to a first portion of the gate structure in a second horizontal direction that is different from the first horizontal direction. The air spacer has a vertical boundary in a cross-sectional side view defined by the vertical direction and the first horizontal direction.

Another aspect of the present disclosure pertains to a semiconductor device. The semiconductor device includes: a substrate and a gate structure located over the substrate in a vertical direction. The gate structure extends in a first horizontal direction. An air spacer extends in the first horizontal direction. The air spacer is separated from the gate structure in a second horizontal direction different from the first horizontal direction. The air spacer is located adjacent to a first segment of the gate structure. A first dielectric spacer extends in the second horizontal direction. The first dielectric spacer is located adjacent to a second segment of the gate structure. The first dielectric spacer and the air spacer form a boundary.

Another aspect of the present disclosure pertains to a method of fabricating a semiconductor device. A gate structure is formed over a substrate. The gate structure includes at least a first dielectric spacer and a second dielectric spacer. The gate structure, the first dielectric spacer, and the second dielectric spacer each extends in a first horizontal direction in a top view. A patterned hard mask structure is formed over the gate structure. The patterned hard mask structure defines an opening that exposes a portion of the gate structure. An etching process is performed through the opening to form an air spacer by at least partially removing the first dielectric spacer. The hard mask structure serves as an etching mask during the etching process.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
    a substrate;
    a gate structure disposed over the substrate in a vertical direction, wherein the gate structure extends in a first horizontal direction; and
    an air spacer disposed adjacent to a first portion of the gate structure in a second horizontal direction that is different from the first horizontal direction, wherein the air spacer has a vertical boundary in a cross-sectional side view defined by the vertical direction and the first horizontal direction, and wherein the air spacer does not completely surround the gate structure in a top view;
    wherein:
    wherein the gate structure includes a second portion that has no air spacers disposed adjacently thereto;
    the first portion of the gate structure is a part of a first transistor;
    the second portion of the gate structure is a part of a second transistor; and
    the first transistor and the second transistor are different types of transistors.

2. The semiconductor device of claim 1, wherein the vertical boundary includes a linear component.

3. The semiconductor device of claim 1, wherein the vertical boundary includes a semi-circular component.

4. The semiconductor device of claim 1, wherein the vertical boundary includes a trapezoidal component.

5. The semiconductor device of claim 1, further comprising:
a first dielectric spacer disposed directly on a sidewall of the gate structure; and
a second dielectric spacer disposed adjacent to the air spacer, wherein the air spacer is disposed between the first dielectric spacer and the second dielectric spacer.

6. The semiconductor device of claim 5, further comprising: a third dielectric spacer disposed between the first dielectric spacer and the second dielectric spacer, wherein the third dielectric spacer forms the vertical boundary with the air spacer.

7. The semiconductor device of claim 1, wherein:
the first transistor has a greater speed than the second transistor.

8. The semiconductor device of claim 1, further comprising: a fin structure that protrudes vertically out of the substrate, wherein the fin structure extends in the second horizontal direction, and wherein the gate structure partially wraps around the fin structure.

9. The semiconductor device of claim 1, wherein in a top view:
the gate structure is elongated in the first horizontal direction and has a first dimension in the first horizontal direction;
the air spacer is elongated in the first horizontal direction and has a second dimension in the first horizontal direction; and
the second dimension is less than the first dimension.

10. The semiconductor device of claim 9, further comprising a plurality of active regions each elongated in the second horizontal direction, wherein the gate structure overlaps with the plurality of active regions in the first horizontal direction in the top view.

11. The semiconductor device of claim 6, wherein:
the third dielectric spacer and the air spacer have a same width measured in the second horizontal direction in a top view; and
the third dielectric spacer is longer than the air spacer in the first horizontal direction in the top view.

12. A semiconductor device, comprising:
a substrate;
a gate structure located over the substrate in a vertical direction, wherein the gate structure extends in a first horizontal direction;
an air spacer that extends in the first horizontal direction, wherein the air spacer is separated from the gate structure in a second horizontal direction different from the first horizontal direction, wherein the air spacer is located adjacent to a first segment of the gate structure; and
a first dielectric spacer that extends in the second horizontal direction, wherein the first dielectric spacer is located adjacent to a second segment of the gate structure, and wherein the first dielectric spacer and the air spacer form a boundary;
wherein:
the first segment of the gate structure belongs to a first type of transistor;
the second segment of the gate structure belongs to a second type of transistor; and
the first type of transistor has a greater speed than the second type of transistor.

13. The semiconductor device of claim 12, further comprising:
a second dielectric spacer that is located directly on a sidewall of the first segment and the second segment of the gate structure; and
a third dielectric spacer spaced apart from the second dielectric spacer in the second horizontal direction, wherein the air spacer and the first dielectric spacer are disposed between the second dielectric spacer and the third dielectric spacer.

14. The semiconductor device of claim 13, wherein the first dielectric spacer has a different material composition than the second dielectric spacer and the third dielectric spacer.

15. A method, comprising:
forming a gate structure over a substrate, wherein the gate structure includes at least a first dielectric spacer and a second dielectric spacer, and wherein the gate structure, the first dielectric spacer, and the second dielectric spacer each extends in a first horizontal direction in a top view;
forming a patterned hard mask structure over the gate structure, wherein the patterned hard mask structure defines an opening that exposes a portion of the gate structure, wherein the forming the patterned hard mask structure comprises forming at least a first hard mask layer and a second hard mask layer over the first hard mask layer, wherein an etching selectivity exists between the first hard mask layer and the second hard mask layer; and
performing an etching process through the opening to form an air spacer by at least partially removing the first dielectric spacer, wherein the hard mask structure serves as an etching mask during the etching process.

16. The method of claim 15, further comprising:
receiving an integrated circuit (IC) layout design;
analyzing the IC layout design;
based on the analyzing, determining a first region of the IC layout design in which air spacers should be formed and a second region of the IC layout design in which air spacers need not be formed; and
facilitating a generation of one or more lithography masks for patterning the hard mask structure, such that the opening defined by the hard mask structure corresponds to the first region but not the second region of the IC layout design.

17. The method of claim 16, wherein:
the analyzing comprises analyzing types of transistor devices located in a plurality of regions of the IC layout design, including the first region and the second region; and
the determining comprises determining, that transistor devices located in the first region have a faster speed than transistor devices located in the second region.

18. The method of claim 15, wherein the etching process forms a vertical boundary between the air spacer and an unremoved portion of the first dielectric spacer.

19. The method of claim 18, wherein the vertical boundary includes a segment that has a linear shape, a semi-circular shape, or a trapezoidal shape.

20. The method of claim 15, wherein the second dielectric spacer is substantially unaffected by the etching process.

* * * * *